United States Patent
Kasai et al.

(10) Patent No.: US 7,216,072 B2
(45) Date of Patent: May 8, 2007

(54) RELAY DEVICE, SERVER DEVICE, TERMINAL DEVICE, AND TRANSLATION SERVER SYSTEM UTILIZING THESE DEVICES

(75) Inventors: Satoshi Kasai, Kahoku-gun (JP); Masaharu Kitaoka, Kawasaki (JP); Itsuro Atobe, Kawasaki (JP); Fumiko Ito, Kawasaki (JP); Makoto Shiotsu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 779 days.

(21) Appl. No.: 09/752,465

(22) Filed: Jan. 3, 2001

(65) Prior Publication Data

US 2001/0018649 A1    Aug. 30, 2001

(30) Foreign Application Priority Data

Feb. 29, 2000    (JP)    ............................ 2000-054952

(51) Int. Cl.
*G10L 15/00*    (2006.01)
(52) U.S. Cl. ............................................. 704/8; 704/2
(58) Field of Classification Search .................... 704/2, 704/3, 8, 9
See application file for complete search history.

(56) References Cited

U.S. PATENT DOCUMENTS

| 4,882,681 | A |   | 11/1989 | Brotz ........................... 364/419 |
| 5,349,368 | A | * | 9/1994 | Takeda et al. ............... 345/684 |
| 5,535,120 | A |   | 7/1996 | Chong et al. ........... 364/419.03 |
| 5,884,246 | A |   | 3/1999 | Boucher et al. ................ 704/2 |
| 5,987,402 | A | * | 11/1999 | Murata et al. .................. 704/2 |
| 6,047,252 | A | * | 4/2000 | Kumano et al. ................ 704/2 |
| 6,119,078 | A | * | 9/2000 | Kobayakawa et al. ......... 704/3 |
| 6,347,316 | B1 | * | 2/2002 | Redpath ....................... 707/10 |
| 6,490,547 | B1 | * | 12/2002 | Atkin et al. .................... 704/8 |

FOREIGN PATENT DOCUMENTS

| JP | 09081549 | 3/1997 |
| JP | 10149359 | 2/1998 |
| JP | 2000 276431 | 6/2000 |

(Continued)

OTHER PUBLICATIONS

Yoden, et al., "A Personal Machine Translation Software for WWW Browser", Proceedings of the 1996 IEEE International Conference on Consumer Electronics, Rosemont, IL, Jun. 5-7, 1996, pp. 234-235, XP-002179282.

(Continued)

*Primary Examiner*—Daniel Abebe
(74) *Attorney, Agent, or Firm*—Staas & Halsey LLP

(57) ABSTRACT

A translation server system of the present invention provides a function of translating a document without feeling any stress irrespective of a performance of a user's own terminal device. A relay device for relaying request data from a terminal device to a server device and response data from the server device to the terminal device in response to the request data, includes a control unit for performing communications with a translation server for translating text information contained in the response data. The translation server translates the text information contained in the response data received from the server device, and a result of this translation is transmitted as response data to the terminal device.

3 Claims, 21 Drawing Sheets

FOREIGN PATENT DOCUMENTS

| | | |
|---|---|---|
| WO | WO 97/18516 | 5/1997 |
| WO | WO 00/05660 | 2/2000 |

OTHER PUBLICATIONS

Murata et al., <<Realtime Machine Translation System for the World Wide Web, Database Inspection, XP 002043731, and Transactions of the Institute of Electronics, Information and Communicatoin Engineers B-I, May 1996, Inst. Electron. Inf. & Commun. Eng. Japan, vol. J79B-I, No. 5, pp. 364-372.

Yoden Naoyuki et al., "Personal Machine Translation Software for WWW Browser", International Conference on Consumer Electronics, 1996 Digest of Technical Papers, ICCE, Rosemont, Jun. 5-7, 1996, International Conference on Consumer Electronics, ICCE, New York, IEEE, U.S. vol. Conf. 15, Jun. 5, 1996, pp. 234-235.

Murata, T. et al., "Realtime Machine Translation System for World Wide Web", INSPEC, May 1996, XP002043731.

European Search Report No. P77889EP01 dated Apr. 11, 2005.

European Search Report No. P77889EP02 dated Apr. 11, 2005.

* cited by examiner

FIG.15

| REGISTRATION No | SENDER | RECEIVER | DIRECTION OF TRANSLATION |
|---|---|---|---|
| 001 | ALL | skasai@aaa.co.jp | ENGLISH-JAPANESE |
| 002 | skasai@aaa.co.jp | jack@bbb.com | JAPANESE-ENGLISH |
| 003 | skasai@aaa.co.jp | betty@ccc.com | JAPANESE-ENGLISH |
| ⋮ | ⋮ | ⋮ | ⋮ |
| NNN | ALL | okada@aaa.co.jp | ENGLISH-JAPANESE |

# RELAY DEVICE, SERVER DEVICE, TERMINAL DEVICE, AND TRANSLATION SERVER SYSTEM UTILIZING THESE DEVICES

BACKGROUND OF THE INVENTION

The present invention relates to a translation server system.

With a spread of the Internet technology typified by World Wide Web (hereinafter abbreviated to WWW) and E-mails over the recent years, a variety of information can be obtained without being aware of the borders. Further, there has been proposed a technology of reducing barriers of languages when exchanging the information by combining the Internet with an auto translation program.

What is proposed in, e.g., Japanese Patent Application Laying-Open Publication No. 9-81549 is a system for readily translating the information obtained in a foreign language owing to a combination of the auto translation program with a client system for accessing WWW.

Further, Japanese Patent Application Laying-Open Publication No. 10-149359 proposes a system for combining mail services with an auto translation system, and setting a language into which the E-mail is translated corresponding to addresses of a mail sender and receiver. According to this system, when receiving the E-mail, the mail text is automatically translated based on the address of the sender.

In the system as disclosed in Japanese Patent Application Laying-Open Publication No. 9-81549, however, the information obtained from WWW is translated in the client terminal. This process has a high load upon the CPU and requires some length of time for the translation. Hence, it is required in this system that the client terminal be provided with a high-performance computer. As a lot of client terminals are needed, it is difficult to actually introduce this type of system.

Moreover, a handheld terminal as a client terminal is now spreading. It is not, however, realistic to utilize the auto translation system in the handheld terminal exhibiting a low throughput.

In addition, if translated by the client terminal, when a plurality of persons access the same information, each person needs to execute the translation, with the result that repetitive futile processes are executed in the system as a whole.

On the other hand, the system disclosed in Japanese Patent Application Laying-Open Publication No. 10-149359 aims at automatically translating the mail text on the basis of the addresses of the mail sender and receiver. Nowadays, however, a domain name, which may be defined as a mail address, is not necessarily classified according to the country. Hence, it is difficult to operate this system without any contradiction in the Internet environment of nowadays, wherein the number of communication terminals more and more increases.

SUMMARY OF THE INVENTION

It is a primary object of the present invention, which was devised to obviate the problems inherent in the prior art described above, to provide a function capable of translating a document without feeling any stress irrespective of a performance of a terminal device of a user.

It is another object to provide a technology of translating document data communicated via a network by automatically judging whether the document data should be translated or not.

The present invention decreases barriers in terms of languages used for exchanging the documents via the network by using the above technology.

To accomplish the above objects, according to one aspect of the present invention, a relay device for relaying request data from a terminal device to a server device and response data from the server device to the terminal device in response to the request data, comprises a translation unit for translating text information contained in the response data. The text information contained in the response data received from the server device is translated, and a result of this translation is transmitted as response data to the terminal device.

According to another aspect of the present invention, a relay device for relaying request data from a terminal device to a server device and response data from the server device to the terminal device in response to the request data, comprises a control unit for performing communications with a translation server for executing a translating process. Text information contained in the response data received from the server device is translated by the translation server, and a result of this translation is transmitted as response data to the terminal device.

The relay device may further comprise a caching unit for caching the translated result of the response data. The control unit, when the translated result of the response data given in response to the request data from the terminal device is cached in the caching unit, may transmit the translated result cached therein by way of response data to the request data to the terminal device.

Namely, the control unit, when receiving the request data from the terminal device, searches whether or not a translated data of the response data to the request data is cached in the caching unit. If the translated data of the response data is cached in the caching unit, the control unit responds to the terminal device by way of the translated response data.

Whereas if the translated data of the response data is not cached in the caching unit, the control unit instructs the server device to transmit the response data and the server device translates the text information contained in the response data, thus responding to the terminal device.

According to still another aspect of the present invention, a terminal device connected to a network via a first relay device for relaying relay data with translating the same data and a second relay device for relay the relay data without translating the same data, comprises an information acquisition module for acquiring information from the network, a translation specification recognizing unit for recognizing whether the translation of the information is specified or not, and a routing unit for switching over the relay device when accessing the network. When recognizing that the translation is specified, the information translated by accessing the network from the first relay device, is obtained, and, when recognizing no specification of the translation, the information that is not translated by accessing the network from the second relay device, is obtained.

According to a further aspect of the present invention, a relay device for relaying data between an internal network in which a principal language for describing text information is prescribed, and an external network in which a category of the language for describing the text information is not limited, comprises a description language judging unit for judging the description language of the text information contained in the data to be relayed, and a translation unit for translating the text information. When the data from the external network are relayed to the internal network, the description language of the text information contained in the same data is translated into the principal language of the internal network.

According to a still further aspect of the present invention, a server device for executing transmitting/receiving services between a service receiving terminal in which a principal language for describing text information is prescribed, and an external communication device in which the language for describing the text information is not limited, comprises a description language judging unit for judging the description language of the text information contained in data to be received, and a translation unit for translating the text information. When receiving the data from the external communication device, the description language of the text information is translated into the principal language of the service receiving terminal.

According to a yet further aspect of the present invention, a server device for executing data transmitting/receiving services between a service receiving terminal and an external communication device, comprises a user information storage module for specifying a user of the service receiving terminal, a translating language by which text information contained in the data is translated, and a translated language into which the text information is translated, and a translation unit for translating the text information.

According to an additional aspect of the present invention, a terminal device connected via a network to a server device for translating text information into a language specified, comprises a document editing unit for editing document data having text information and display control information for the text information, and a transmitting/receiving unit for transmitting and receiving the text information to and from the server device. The server device is made to translate a part or the whole of the document data in the process of being edited into the language specified.

According to the present invention, there is also provided a readable-by-computer recording medium recorded with a program for making a computer function as each of the devices described above.

As explained above, a scheme of the present invention is that the relay device and the server device are made to translate the text information, and it is therefore possible to translate the document without feeling any stress.

Further, according to the present invention, the relay device provided between the plurality of client devices and the server device is given the translating function, and hence there is no necessity of providing each client device with the translating function, whereby a consumption of resources of the client device can be reduced.

Moreover, according to the present invention, the data translated in response to the request from other client device are retained and used as the response data to another request from the different client device. Therefore, this contrivance contributes to decrease a load upon the network because of reducing both of the repetitive translating processes and the number of data requests given to the server device.

Further, according to the present invention, the server device is provided with the description language judging unit for judging the description language of the text information contained in the data, and hence it is feasible to translate the document date received from the external network by automatically judging whether the document data should be translated or not.

Thus, according to the present invention, the barriers of the languages used in exchanging the documents via the network can be reduced.

BRIEF DESCRIPTION OF THE DRAWINGS

FIG. 15 is a diagram showing a data structure of a user table;

DETAILED DESCRIPTION OF THE PREFERRED EMBODIMENTS

Preferred embodiments of the present invention will hereinafter be described with reference to the accompanying drawings.

First Embodiment

A first embodiment of the present invention will hereinafter be discussed referring to FIGS. 1 through 8.

Figure 1:
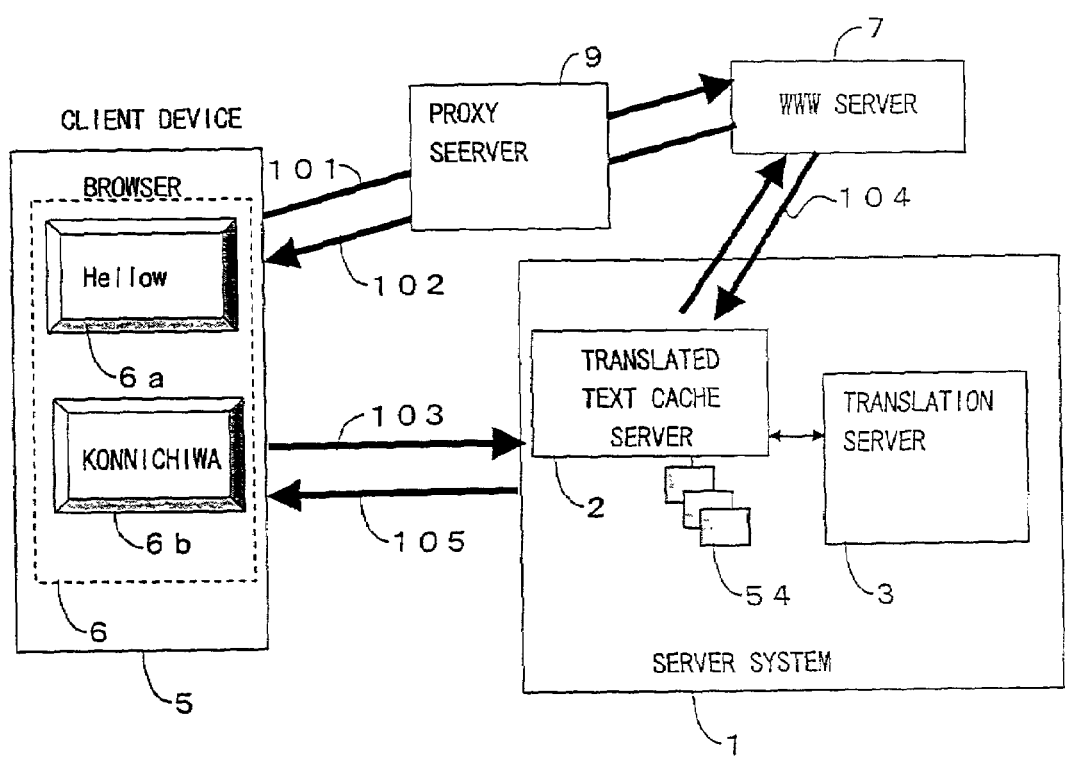
FIG. 1 is a diagram showing an architecture of a homepage translation system in a first embodiment of the present invention.
Figure 2:
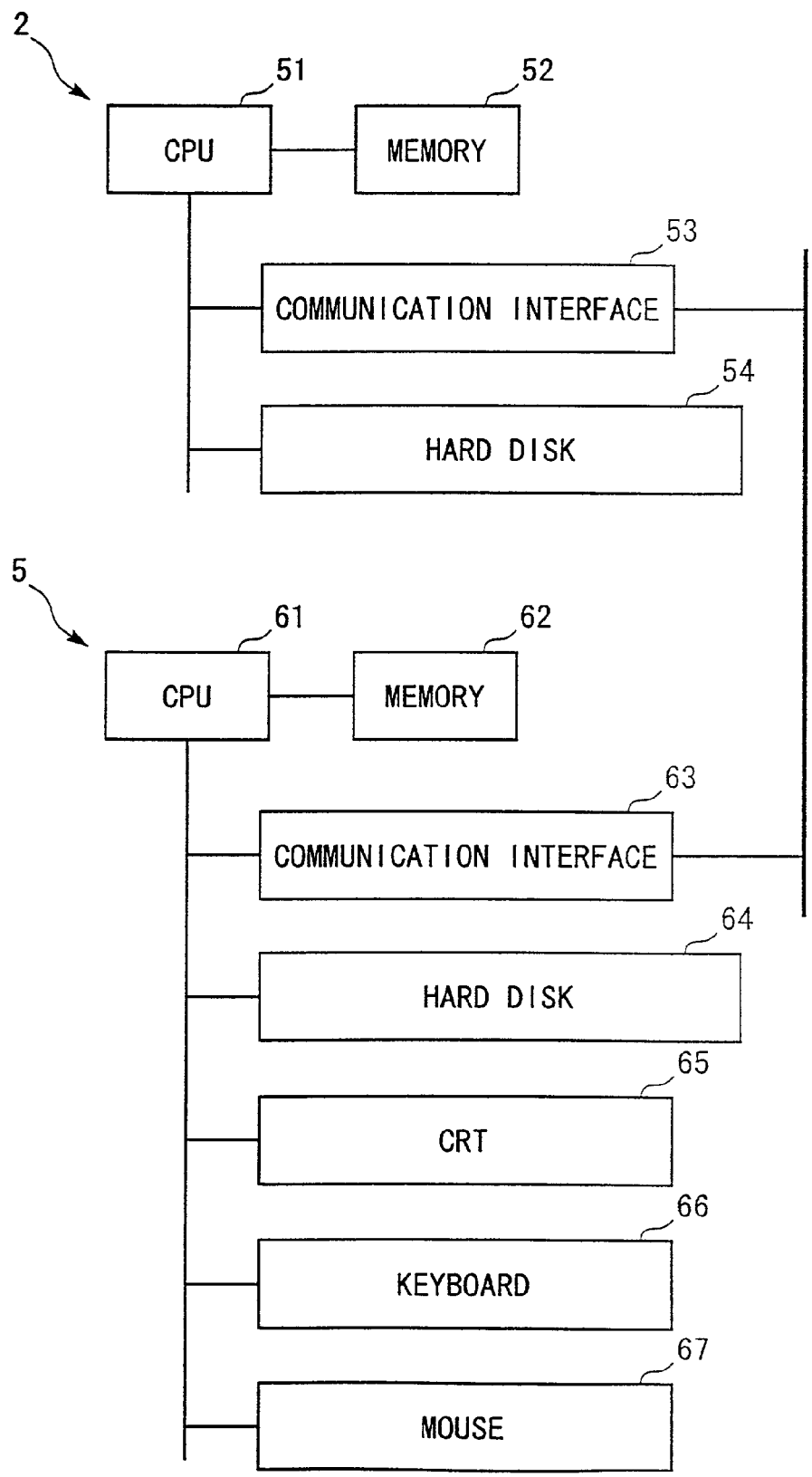
FIG. 2 is a diagram illustrating a hardware architecture of a translated text cache server and a client device.
Figure 3:
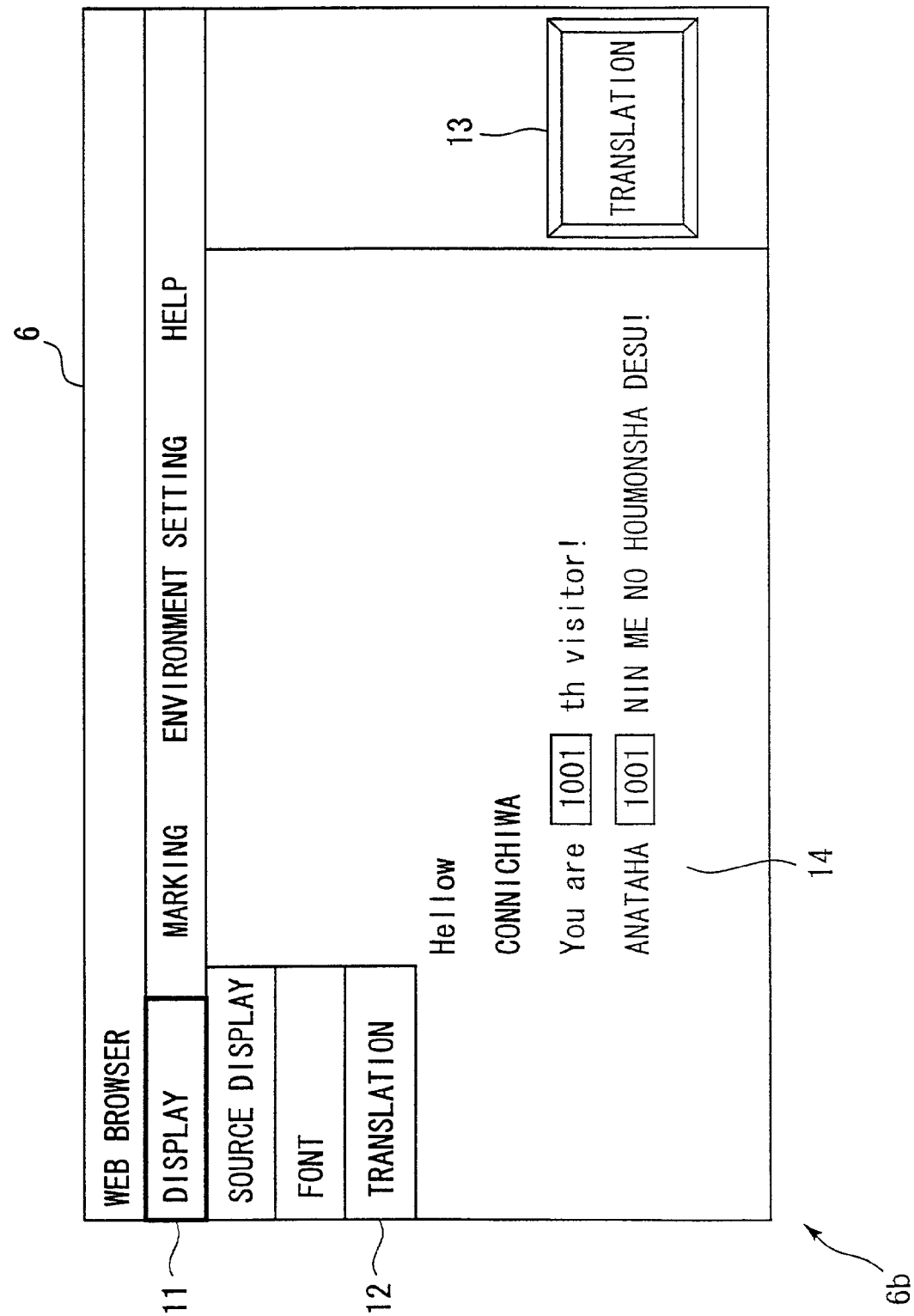
FIG. 3 is a view showing a display screen of a browser.
Figure 4:
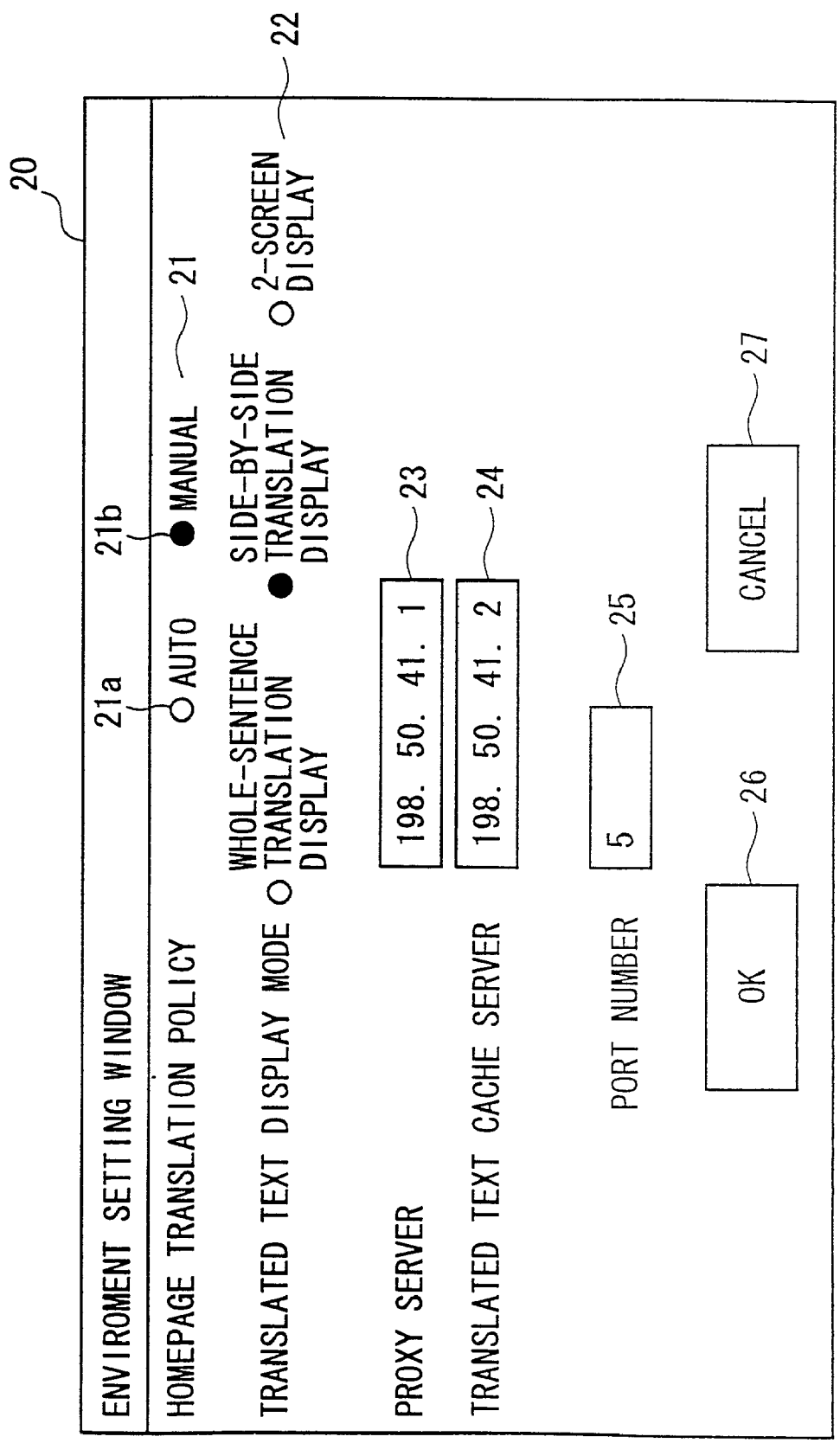
FIG. 4 is a view showing an environment setting window 20 of the browser.
Figure 5:
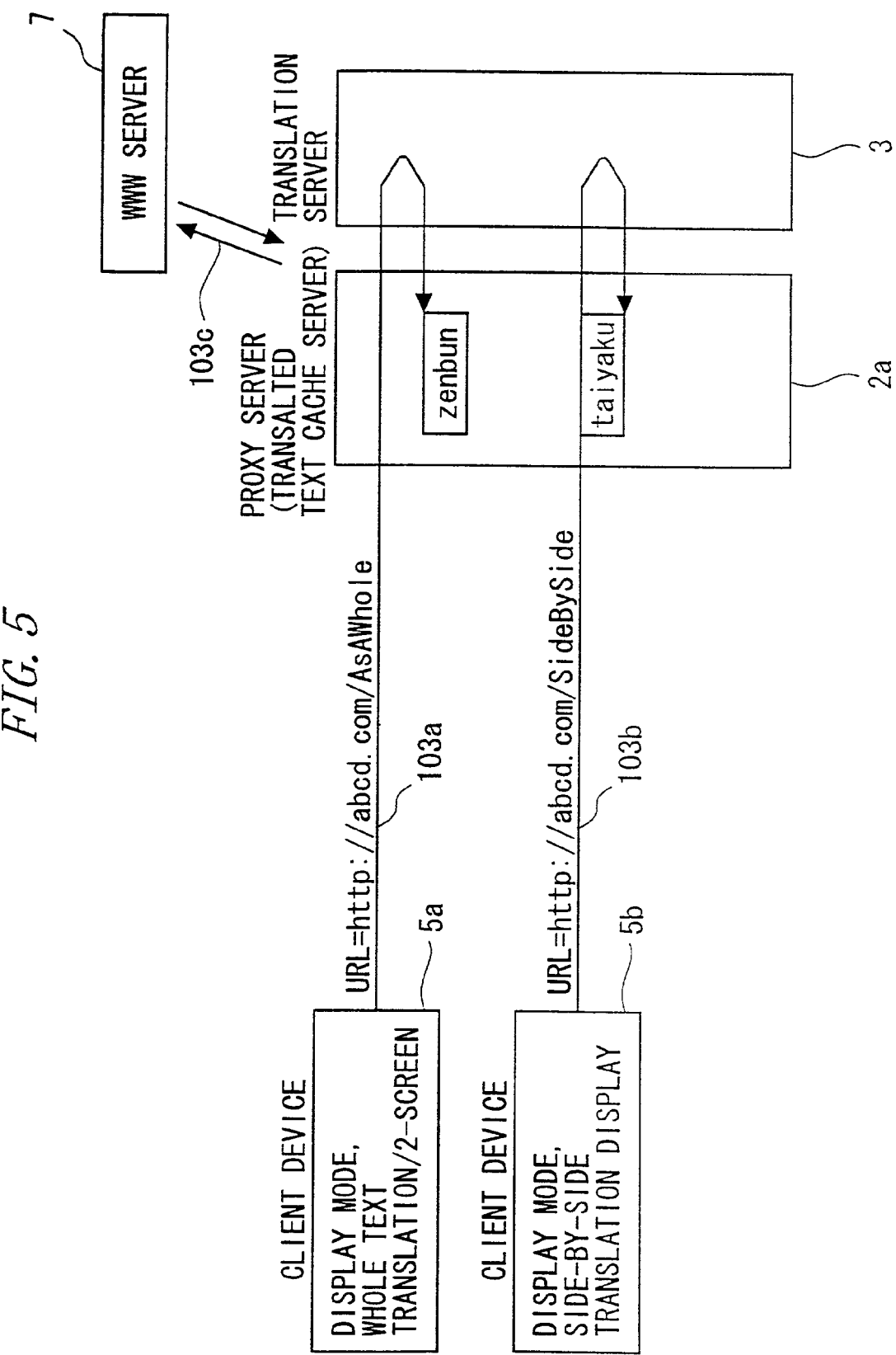
FIG. 5 is a diagram showing a caching method in the homepage translation system.
Figure 6:
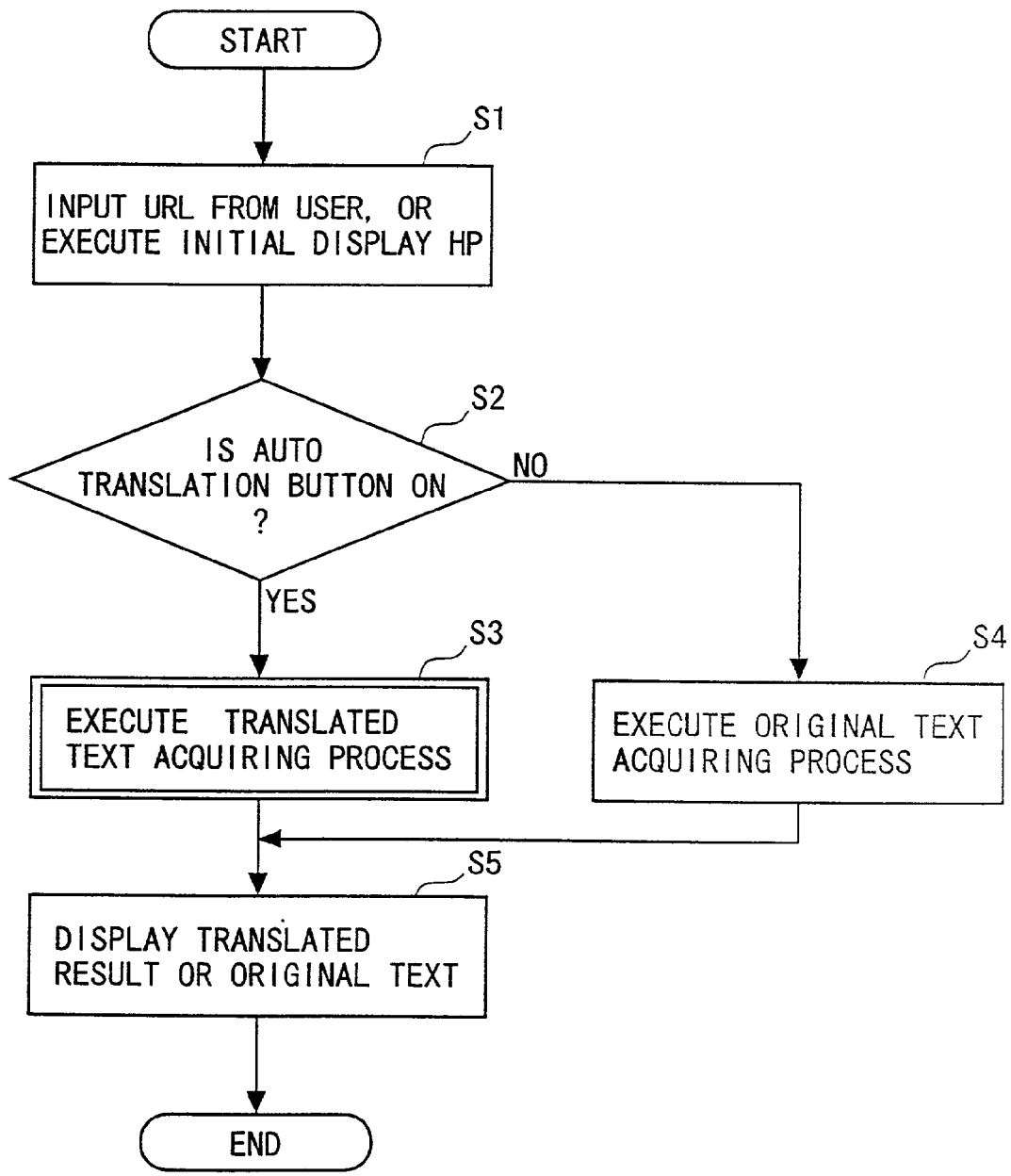
FIG. 6 is a flowchart (1) showing processes by the client device.
Figure 7:
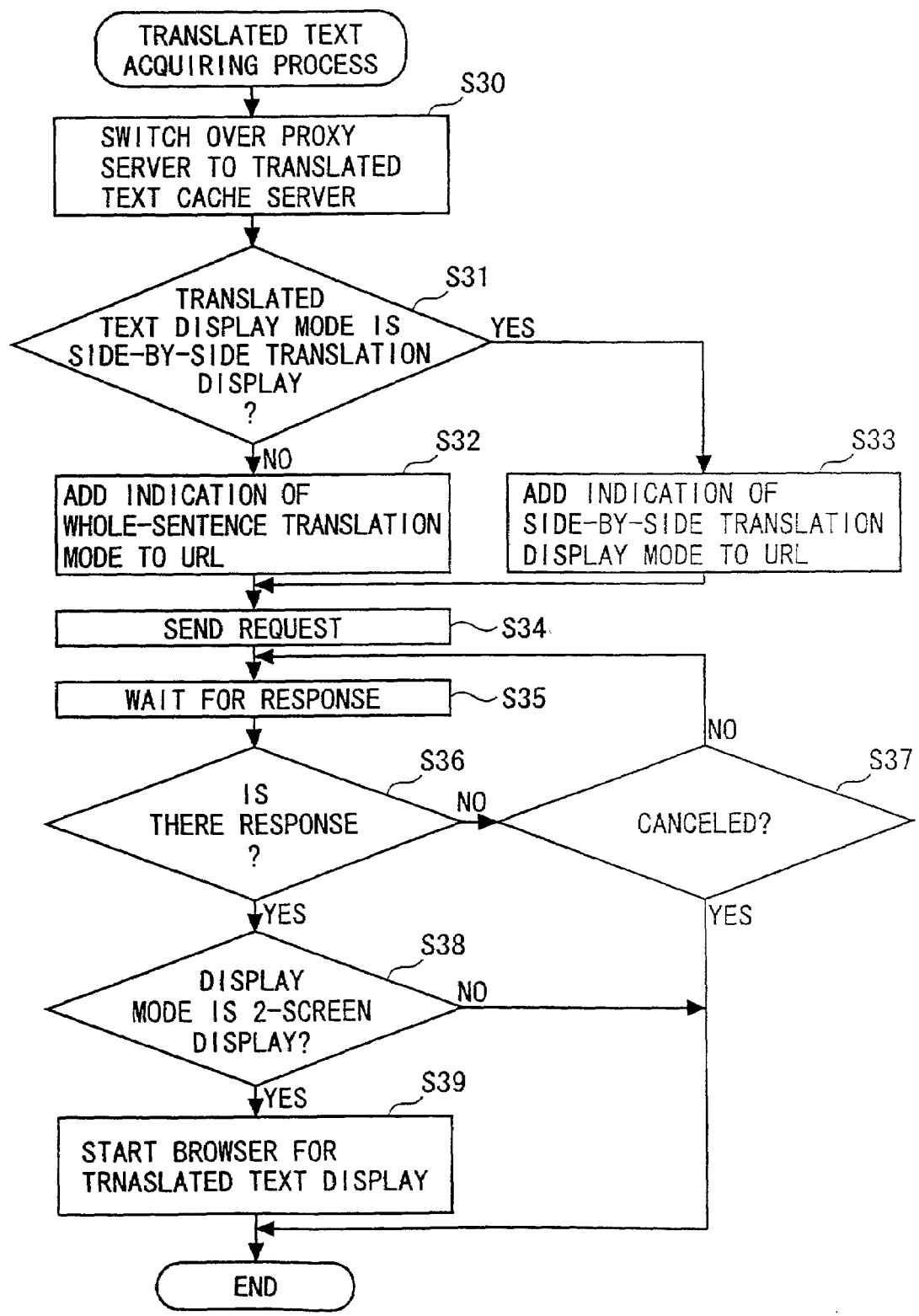
FIG. 7 is a flowchart (2) showing the processes by the client device.
Figure 8:
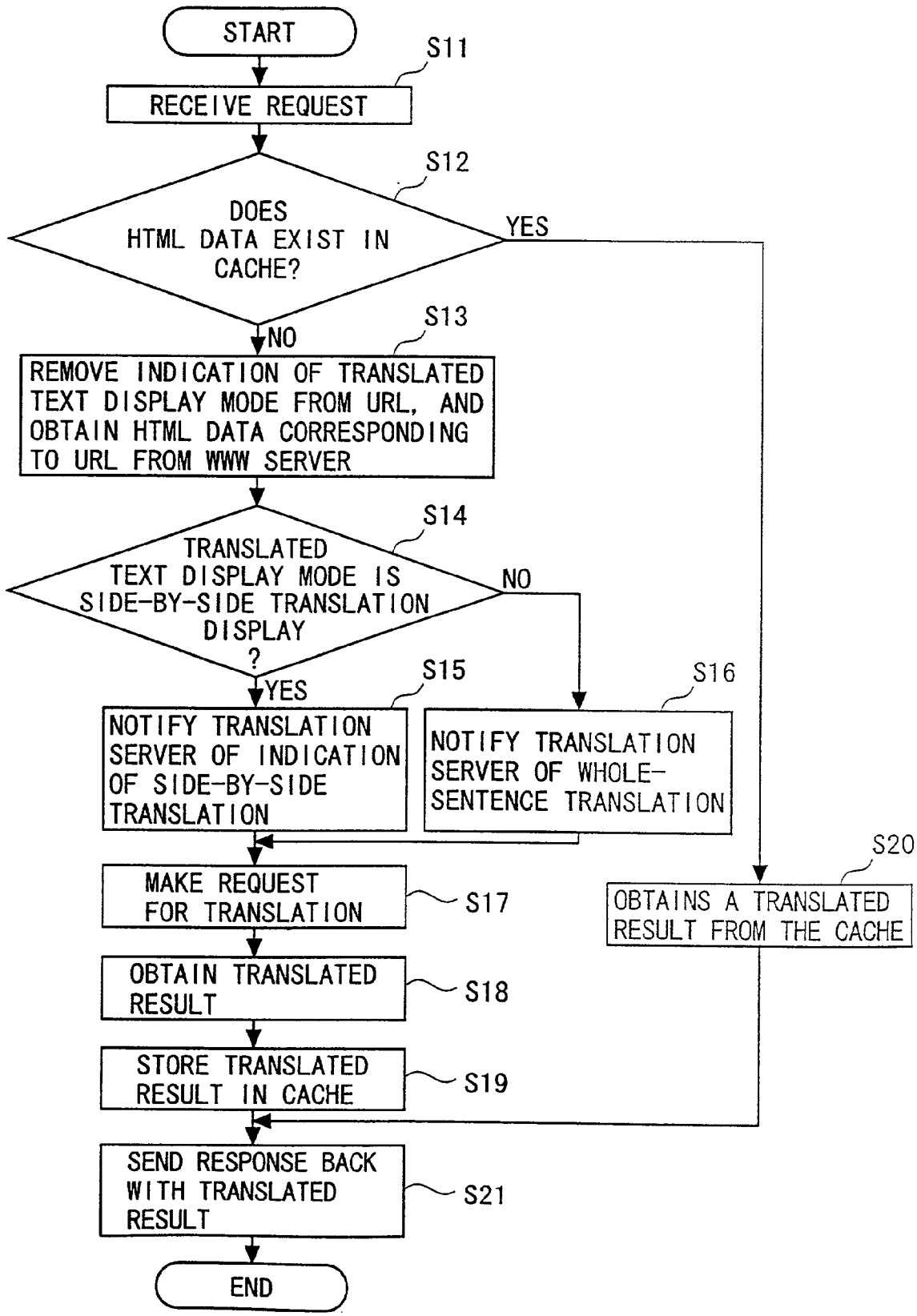
FIG. 8 is a flowchart showing processes by the translated text cache server.

FIG. 1 is a diagram showing an architecture of a homepage translation system in the first embodiment. FIG. 2 is a diagram illustrating a hardware architecture of a translated text cache server 2 and a client device 5 in FIG. 1. FIG. 3 is a view showing a display screen of a homepage browsing program (which will hereinafter be called a browser 6) executed by the client device 5. FIG. 4 is a view showing an environment setting window 20 of the browser 6. FIG. 5 is a diagram showing a caching method in this homepage translation system. FIGS. 6 and 7 are flowcharts each showing processes of a control program executed by the client device 5. FIG. 8 is a flowchart showing processes of a control program executed by the translated text cache server 2.

<Architecture>

FIG. 1 is the diagram showing the architecture of this homepage translation system. This homepage translation system is constructed of the client device 5 (corresponding to a terminal device) for accessing the Internet (corresponding to an external network), a proxy server 9 for relaying an access from the client device 5 etc to the Internet, and a server system 1 connected via the network to the client device 5.

Further, the server system 1 is constructed of the translated text cache server 2 (corresponding to a relay device) and a translation server 3. The server system 1 (the translated text cache server 2) and the proxy server 9 according to the present invention, each incorporate a function of transmitting request data given from the client device 5 to a World Wide Web server (which will hereinafter abbreviated to WWW server) 7 on the Internet, and transmitting response data given from the WWW server 7 back to the client device 5.

The client device 5 is accessible to the WWW server 7 via the proxy server 9 or the translated text cache server 2.

FIG. 2 is the diagram showing the hardware architecture of the translated text cache server 2 and the client device 5.

The translated text cache server 2 includes a CPU 51 for executing the control program and an application program, a memory 52 for storing the control program etc executed by the CPU 51 and data processed by the CPU 51, a communication interface 53 for implementing communications by accessing the network, and a hard disk 54 for recording the data processed by the CPU 51.

The CPU 51 executes the control program stored in the memory 52, thereby providing a function as the translated text cache server 2.

The memory 52 is stored with the control program executed by the CPU 51 and the data processed by the CPU 51.

The communication interface 53, in response to a command from the CPU 51, forwards the communication data to the network. Further, the communication interface 53 receives the communication data from the network.

The hard disk 54 records the data processed by the CPU 51 and the data of which the processing has been completed.

The client device also includes a CPU 61, a memory 62, a communication interface 63 and a hard disk 64, which incorporate the same functions as those in the translated text cache server 2. In addition to these components, the client device 5 further includes a CRT 65 (corresponding to a display unit) for displaying the data to a user, a keyboard 66 used for the user to input the data, and a mouse 67 used for the user to operate menus and icons on the CRT 65.

The client device 5 shown in FIG. 1 executes the browser 6 (corresponding to an information acquisition module), thereby displaying a home page provided from the WWW server 7 on the CRT 65. Namely, the client device 5 establishes a connection with the WWW server 7 on the basis of Hypertext Transfer Protocol (which will hereinafter be abbreviated to http). In a state where this connection has been established, the client device 5 transmits a request 101 to the WWW server 7, and obtains a response 102 from the WWW server 7.

This response 102 contains data, images, voices etc described by Hypertext Markup Language (which will hereinafter be abbreviated to HTML). The client device 5 displays these items of data on the CRT 65.

A characteristic function of this client device 5 is to display a result of translation of the homepage on the CRT 65 by the user performing a predetermined operation. The client device 5 accesses the WWW server 7 normally via the proxy server 9 (corresponding to a second relay device).

In the case of translating the homepage, the CPU 51, which executes the browser 6 in the client device 5, transmits a request 103 to the translated text cache server 2 (corresponding to a first relay device) instead of transmitting the request 101 to the proxy server 9 (wherein the CPU 61 of the client device 5 that executes the browser 6 corresponds a routing unit).

The translated text cache server 2 checks whether or not the result of translation of the homepage that has been requested 103, exists in the self hard disk 54.

If this piece of information exists on the hard disk 54, the translated cache server 2 pads the result of translation into the response 105 and sends it back (wherein the hard disk 54 corresponding to a caching unit and will hereinafter be simply called a cache).

If that piece of information does not exists on the hard disk 54, the translated text cache server 2 transmits the request to the WWW server 7 and receives as the response 104 the HTML data describing that homepage. Further, the translated text cache server 2 removes a tag (corresponding to display control information) of the HTML data, and reads text information. The translated text cache server 2 transmits this item of text information to the translation server 3 on the network. The translation server 3 translates the received text information and sends a translated result back to the translated text cache server 2.

The translated text cache server 2 embeds the received result of translation into the text information in the HTML data, and stores its result on the hard disk 54. Further, the translated text cache server 2 transmits the response 105 containing the HTML data into which this translated result is embedded, back to the client device 5.

The client device 5 receives the response 105 and displays this response 105 on a screen 6b of the browser 6. The homepage information provided from the WWW server 7 is thereby translated and displayed on the client device 5.

Thus, in a state where the translated homepage information is retained in the translated text cache server 2, when the request 103 for this homepage is issued to the translated text cache server 2, the translated text cache server 2 sends the response 105 containing the retained homepage information back to the client device having issued the request without accessing the WWW server 7.

<Layout on Screen of Browser>

FIG. 3 shows the screen 6b displayed by the browser 6.

This browser 6 displays a display menu 11, a marking menu, an environment setting menu, a help menu and a homepage display area 14 on the screen 6b.

The display menu 11 contains selection items such as specification of "source display", specification of "font" and "translation" 12. The user is able to display source data in the HTML format for describing the homepage by selecting "source display". Further, the user is able to set a font of character data to be displayed by selecting "font". Moreover, the user is able to translate a sentence to be displayed in the homepage by selecting "translation" 12 (corresponding to an individual translation indicator).

The marking menu on the screen provides a function of storing an address (uniform resource locator, which will hereinafter abbreviated to URL) of a homepage exhibiting a high access frequency.

The environment setting menu provides a function of setting a condition on which the browser 6 accesses the homepage on the network and a condition for displaying on the screen 6b etc. An environment setting window 20 in FIG. 4 is displayed by selecting the environment setting menu, and a set value at the present is displayed therein. The user changes this setting and stores it, whereby the browser 6 can be made to perform a desired function.

A translation button 13 (corresponding to an individual translation indicator) provides a translation indicating function as by the translation 12 of the display menu 11. To be specific, when the user depresses the translation button 13, the text information of the homepage displayed is translated.

Now, English sentences and Japanese sentences are displayed in a side-by-side translation mode. The side-by-side translation mode is a mode in which English sentences and Japanese sentences as a translation thereof are, as shown in FIG. 3, alternately displayed.

The user, with the selection of the translation 12 of the display menu 11 or the depression of the translation button 13, the English screen and the translation screen (the screen in the side-by-side translation mode in FIG. 3) can be alternately switched.

<Environment Setting Window>

FIG. 4 shows a configuration of the environment setting window 20. This environment setting window 20 is, as explained above, displayed upon detecting the selection of the environment setting menu.

As shown in FIG. 4, the environment setting window 20 includes, sequentially from the upper area of the window, a homepage translation policy specifying field 21, a translated text display mode specifying field 22, a proxy server specifying field 23, a translated text cache server specifying field 24, a port number specifying field 25, an OK button 26 and a cancel button 27.

The homepage translation policy specifying field 21 specifies whether the translation of the homepage is executed automatically or manually. The homepage translation policy specifying field 21 is therefore provided with an auto translation button 21a (corresponding to an auto translation indicator) and a manual translation button 21b that are set exclusively each other.

When the homepage translation policy specifying field 21 is set in an auto mode (when the auto translation button 21a is switched ON), the homepage is automatically translated. In this setting, with a user's operation on the screen, the request 103 is always sent to the translated text cache server 2 instead of the request 101 being transmitted to the proxy server 9. Namely, the information on the homepage is always available via the translated text cache server 2.

While on the other hand, the homepage translation policy specifying field 21 is set in a manual mode (when the manual translation button 21b is switched ON), the browser 6 sends the request 101 to the WWW server 7 via the proxy server 9. Therefore, the browser 6 normally displays the original homepage information contained in the response 102. If the client device 5 detects the user's selection of the translation 12 of the display menu 11 or the user's depression on the translation button 13 during the above display, the client device 5 sends the request 103 containing URL (corresponding to an identifier) of the homepage displayed to the translated text cache server 2. Consequently, in the same way as the above, the response 105 containing the translated homepage information is sent back from the translated cache server 2 and displayed in the homepage display area 14.

The translated text display mode specifying field 22 provides a function of changing a display mode of displaying the translation of the homepage. This translated text display mode includes three types of modes such as a whole-sentence translation display mode, a side-by-side translation display mode and a 2-screen display mode.

The whole-sentence translation display mode is a mode in which full sentences of the homepage in English version are translated into Japanese sentences. That is, the original text of the text information contained in the original homepage is replaced with the translated texts, and the homepage is thus displayed.

The side-by-side translation display mode is that the text information is segmented at every phrase, and both of the original text and the translated text are displayed on the homepage. FIG. 3 shows one example of the side-by-side translation display in the homepage display area 14.

The 2-screen display mode is a mode of displaying two screens for the original homepage and the homepage in the translated version.

<Caching Method>

FIG. 5 shows an outline of the caching method in the homepage translation system. As shown in FIG. 5, in this homepage translation system, a proxy server 2a functions as the translated text cache server 2. To be more specific, the proxy server 2a, when receiving requests 103a, 103b from client devices 5a, 5b etc and relaying the requests 103 etc, searches whether or not a result of translation of the homepage that should be responded to the request 103a etc is retained in the cache.

If the translated result corresponding to the request 103a etc is retained, the proxy server 2a requests neither the WWW server 7 for relaying nor the translation server 3 for translating, and responds to the client device 5a etc with the information of the translated homepage retained therein.

In this process, the caching based on URL may be appropriate. That is, the information of the translated homepage is cached in an address on the hard disk 54 that is based on URL specified by the request 103a etc. Then, when the request 103a etc for that homepage is given next time, the hard disk 54 (the cache) may be searched inside based on URL. In this process, URL is referred to as a key of the cache.

As discussed above, however, in accordance with the first embodiment, the whole-sentence translation display mode, the side-by-side translation display mode and the 2-screen display mode are provided as the translation display mode (corresponding to a translation mode). Therefore, if the cache is accessed by use of URL of the homepage simply requested, it is impossible to distinguish between those tree types of display modes.

Accordingly, it is assumed that the client device 5a set in, e.g., the whole-sentence translation display mode makes the request 103a for the homepage located by URL such as http://abcd.com, and that the contents of that homepage are retained in the cache in the whole-sentence translation display mode. Next, it is presumed that the client device 5b set in the side-by-side translation display mode issues the request 103b for the same homepage.

In this case, the proxy server 2a is unable to distinguish between the homepage displayed in the whole-sentence translation display mode and the homepage displayed in the side-by-side translation display mode from their URLs. Hence, the information of the homepage displayed in the whole-sentence translation display mode hits the request 103b on the cache, which is issued from the client device 5b set in the side-by-side translation display mode. As a result, the homepage in the whole-sentence translation display mode is displayed on the client device 5b set in the side-by-side translation display mode.

For troubleshooting this problem, according to the homepage translation system, a piece of information for specifying the translated text display mode is added to the tail of URL. For instance, URL such as http://abcd.com/AsAWhole is specified for the request 103a given from the client device 5a set in the whole-sentence translation display mode.

The proxy server 2a searches based on this URL whether or not the homepage specified by http://abcd.com is cached in the whole-sentence translation display mode. If this search is hit on the cache, the proxy server 2a transmits the information of that homepage back.

The proxy server 2a, if not hit on the cache, generates a request 103c with http://abcd.com specified as URL by eliminating the character string, i.e., AsAWhole padded at the tail, and sends this request to the WWW server 7. Next, the proxy server 2a makes the translation server 3 translate the text information contained the HTML data obtained as a response thereto. Subsequently, the proxy server 2a modifies the HTML data in the whole-sentence translation display mode by use of the translated result, and retains the modified data in the cache, wherein URL such as http://abcd.com/AsAWhole is used as a key. Finally, the proxy sever 2a sends the modified HTML data back to the client device 5a.

On the other hand, URL such as http://abcd.com/SideBySide is specified for the request 103b given from the client device 5b set in the side-by-side translation display mode. The proxy server 2a searches based on this URL whether or not the homepage specified by http://abcd.com is cached in the side-by-side translation display mode. If this search is hit on the cache, the proxy server 2a transmits the information of that homepage back. The proxy server 2a, if the search not hit, as in the above case, makes the request 103c to the WWW server 7 and a request to the translation server, modifies the received HTML data, stores the data in the cache (with URL of http://abcd.comSideBySide serving as a key in this case), and sends the response 103b back.

<Function and Effect>

FIGS. 6 and 7 are flowcharts each showing processes by the client device 5. FIG. 8 is also a flowchart showing processes by the translated text cache server 2. The client device 5 and the translated text cache server 2 executes these processes, thereby providing a function as the homepage translation system.

As shown in FIG. 6, the client device 5 executes the browser 6 in the CPU 51, and waits for an input of URL from the user (S1). Note that immediately after the browser 6 has been executed, the client device 5 displays an initial homepage.

In the process S1, when detecting the input of URL from the user, the client device 5 judges whether or not the auto translation button 21a is ON (S2).

If the auto translation button 21a is ON, the client device 5 executes a translated text acquiring process (S3). Whereas if the auto translation button 21a is not ON (while the manual translation button 21b is ON), the client device 5 obtains the HTML data as the original (S4).

Next, the client device 5 displays the homepage as the original or translated version (S5).

FIG. 7 is a flowchart showing details of the translated text acquiring process (S3 in FIG. 6). In this process, the client device 5 obtains the translated text of the HTML data that describe the homepage.

To start with, the client device 5 switches over the proxy server to the translated text cache server 2 from what is normal (S30).

Next, the client device 5 judges whether or not the translated text display mode is the side-by-side translation display mode (or the whole-sentence translation display mode) (S31). When the translated text display mode is the whole-sentence translation display mode, the client device 5 adds the indication (AsAWhole) of the whole-sentence translation display mode to URL specified by the user (S32).

On the other hand, when the translated text display mode is the side-by-side translation display mode, the client device 5 adds the indication (SideBySide) of the side-by-side translation display mode to URL specified by the user (S33).

Next, the client device 5 specifies URL and transmits the request to the translated text cache server 2 (S34). The client device 5, in this state, waits for a response from the translated text cache server 2 (S35).

If given no response, (NO in the judgement in S36), it is confirmed whether or not the unillustrated cancel button is depressed (S37). Upon detecting that the unillustrated cancel button is depressed (YES in the judgement in S37), the client device 5 finishes the processing. If incapable of detecting that the unillustrated cancel button is depressed (NO in the judgement in S37), the client device 5 goes back again to the wait-for-the-response state (S35).

If given the response, the client device 5 judges whether the translated text display mode is the 2-screen display mode or not (S38). In the case of the 2-screen display mode, the client device 5 starts a browser 6b for displaying the translated text (S39), and comes to an end of the translated text acquiring process.

Whereas if the translated text display mode is not the 2-screen display mode, the client device 5 directly finishes the translated text acquiring process.

FIG. 8 is a flowchart showing processes by the translated text cache server 2.

To begin with, the translated text cache server 2 receives the request (S11). Next, the translated text cache server 2 judges whether or not the HTML data corresponding to URL specified in that request exist in the cache (S12). If the HTML data exist in the cache, the translated text cache server 2 obtains a translated result from the cache (S20), and sends a response back (S21).

Whereas if the HTML data corresponding to URL do not exist in the cache, the translated text cache server 2 removes the indication (AsAWhole or SideBySide) of the translated text display mode out of URL, and obtains an HTML file from the WWW server 7 (S13).

Next, the translated text cache server 2 judges whether or not the translated text display mode is the side-by-side translation display mode (or the whole-sentence translation display mode) (S14). If the translated text display mode is the side-by-side translation display mode, the translated text cache server 2 notifies the translation server 3 of a side-by-side translation (S15).

Whereas if not the side-by-side translation display mode (the whole-sentence translation display mode), the translated text cache server 2 notifies the translation server 3 of a whole-sentence translation (S16).

Next, the translated text cache server 2 request the translation server 3 to translate the sentence (S17). Subsequently, the translated text cache server 2 obtains a translated result from the translation server 3 (S18).

Next, the translated text cache server 2 stores the translated result in the cache (S19). At this time, URL with the indication (AsAWhole or SideBySide) of the translated text display mode is used as a key for searching the cache.

Subsequently, the translated text cache server 2 sends the response back because of having obtained the translated result (S21), and comes to an end of processing.

As discussed above, according to the homepage translation system in the first embodiment, the translated text cache server 2 retains the translated result, and hence, when the same homepage is accessed a plurality of times, the display of the translated homepage is speeded up. Further, when the plurality of client devices 5 access the same homepage, it never happens that the translation of the same homepage is repeated.

Moreover, in the first embodiment, the translation server 3 on the network executes the translation. Accordingly, the translation can be implemented irrespective of how much the client device 5 has resources (a capacity of the memory 62, a performance of the CPU 61, and so on). Namely, even if the client device 5 is a handheld terminal or cellular phone exhibiting a low capability, the translation is executed at a high speed.

Further, the client device 5 in the first embodiment is provided with the side-by-side translation display mode, the whole-sentence translation mode, etc as the translated text display mode. The character string for specifying the translated text display mode is added to the tail of URL, then transmitted to the translated text cache server 2, and thus used as the key for searching the cache. As a result, even when the indications of the whole-sentence translation display mode and of the side-by-side translation display mode are transmitted to the same translated text cache server 2, it is feasible to translate the homepage with the distinction between these display mode, store the translated result in the cache and read it from the cache.

Thus, the translated result corresponding to the mode is cached, thereby making it possible to generate the response data to the client device at a higher speed than by diverting the translated result in other mode. The diversion of the translated result in other mode implies caching the translated result in other mode and processing it into a content corresponding to the specified mode.

Further, in the first embodiment, whether the homepage is to be translated or not is selected by switching over the proxy server for transmitting the request from the client device 5. Therefore, owing to the addition of the translated text cache server 2, the translation system on the network can be configured without exerting the influence upon the conventional network.

Moreover, the unnecessary translating process can be reduced not by translating always the data obtained from the WWW server 7 but by executing the translating process corresponding to the indication (the manual translation) by the user, thereby decreasing the processing load on the translation of the homepage.

<Modified Example of Language for Describing Homepage>

The homepage is described by HTML in the first embodiment. The embodiment of the present invention is not, however, limited to a category of the homepage description language. For example, the present invention can be embodied in a case where the homepage is described by XML (eXtensible Markup Language) into which HTML is extended. Moreover, the present invention can be also applied to a case where a homepage is described by a subset of HTML.

<Change of Server>

The translated text cache server 2 and the translation server 3 are actualized by use of the different proxy serves in the first embodiment. The embodiment of the present invention is not, however, confined to this architecture. For instance, the translated text cache server 2 and the translation server 3 may be actualized by use of the same proxy server.

Note that the above server function is preferably actualized by the proxy server as demonstrated in the embodiment discussed above, however, the present invention is not necessarily limited to this method. That is, the processes of the translated text cache server 2 shown in FIG. 8 are executed in a relay device (incorporating the communicating function) such as a router, bridge and hub on the network, which serve to connect the client device 5 to the WWW server 7, whereby the present invention can be embodied.

Further, there is no necessity of newly providing the translation server 3, and the existing translation service may also be utilized. The existing translation service is that when the original text is transmitted by way of E-mail to a predetermined address, the translation server executes the translating process and transmits its translated text back to the sender. For example, the translated text cache server 2 extracts the text information of the HTML data and transmits the text information by way of E-mail to an address specified in the translation service, and the translated text to be sent back may be received and utilized for the processing according to the present invention.

<Modified Example of Cache>

The translated text cache server 2 involves the use of the hard disk 54 as the cache in the first embodiment. The embodiment of the present invention is not, however, limited to this architecture. For instance, a semiconductor memory such as a DRAM (Dynamic Random Access Memory), an SRAM (Static Random Access Memory) may also be used as a cache.

Further, as a matter of course, the key of the cache is not restricted to the character string (AsAWhole or SideBySide).

<Auto Judgement of Description Language>

In the first embodiment, when the user indicates the auto or manual translation, the request is transmitted to the translated text cache server 2. The translated text cache server 2 obtains the HTML data from the WWW server 7, and the translation server 3 is made to translate the HTML data.

It may also be automatically judged whether or not the HTML data obtained by the translated text cache server 2 need to be translated.

The translated text cache server 2 is actualized by the proxy server in the first embodiment. Accordingly, the translated text cache server 2 belongs to a predetermined internal network (which is known as a domain) provided with access proxy services to the Internet. It may be considered that there is substantially one category of language used for describing the text information in the client device 5 etc within this domain. This language is called a principal language.

The translated text cache server 2 checks the description language of the HTML data to be relayed to within the domain, and, if this description language is different from the principal language, indicates the translation server to translate it.

A method of judging the description language of the text information may be such that if, for instance, a predetermined or larger number of 2-byte hiragana (Japanese phonetic syllables) or katakana (angular Japanese phonetic syllables) are detected in the text information, the language may be judged to be Japanese. Further, if a predetermined or larger number of "the" as a 1-byte character string are detected in the text information, the text information concerned may be judged to be English.

If these elements are mixed, there are counted the number of 2-byte hiragana or katakana in the text information and the number of 1-byte English letters in the text information, and a judgement may be made corresponding to quantities of those letters.

According to the principal language judging method, the judgement might encounter different languages (English and French with respect to the 1-byte system, and Japanese and the Hunkul alphabet even in the same code system (1-byte notation/2-byte notation). Therefore, if whether or not there are a word and a character code used in only the principal language is set as a judgment condition, it is feasible to enhance accuracy of the judgment.

The translated text cache server 2 may judge the number of the characters and the number of character strings described above from the whole of the HTML data received. Further, it may be judged from a predetermined part of the HTML data described above.

Further, the description language may also be judged by use of a piece of character code set information described in a header of the HTML data received from the WWW server 7.

The above-mentioned auto judgement of the description language is not limited to the case where Japanese is used as the principal language, and the data described in English are translated. Namely, the present invention can be, as a matter of course, applied irrespective of the categories of the translation target language (the original language) and the principal language (the translated language).

<Readable-by-Computer Recording Medium>

The program shown in the first embodiment can be recorded on a readable-by-computer recording medium. Then, a computer reads and executes the control program on this recording medium, whereby the computer can function as the translated text cache server 2 or the client device 5 shown in the first embodiment.

Herein, the readable-by-computer recording medium embraces recording mediums capable of storing information such as data, programs, etc. electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<Data Communication Signal Embodied in Carrier Wave>

Furthermore, the control program may be stored in the hard disk and the memory of the computer, and downloaded to other computers via communication media. In this case, the program is transmitted as data communication signals embodied in carrier waves via the communication media. Then, the computer downloaded with this program can be made to function as the translated text cache server 2 or the client device 5 as well in the first embodiment.

Herein, the communication media may be any one of cable communication mediums (such as metallic cables including a coaxial cable and a twisted pair cable, or an optical communication cable), and wireless communication media (such as satellite communications, ground wave wireless communications, etc.).

Further, the carrier waves are electromagnetic waves for modulating the data communication signals, or the light. The carrier waves may, however, be DC signals (in this case, the data communication signal take a base band waveform with no carrier wave). Accordingly, the data communication signal embodied in the carrier wave may be any one of a modulated broadband waveform and an unmodulated base band signal (which corresponds to a case of setting a DC signal having a voltage of 0 as a carrier wave).

Second Embodiment

Figure 9:
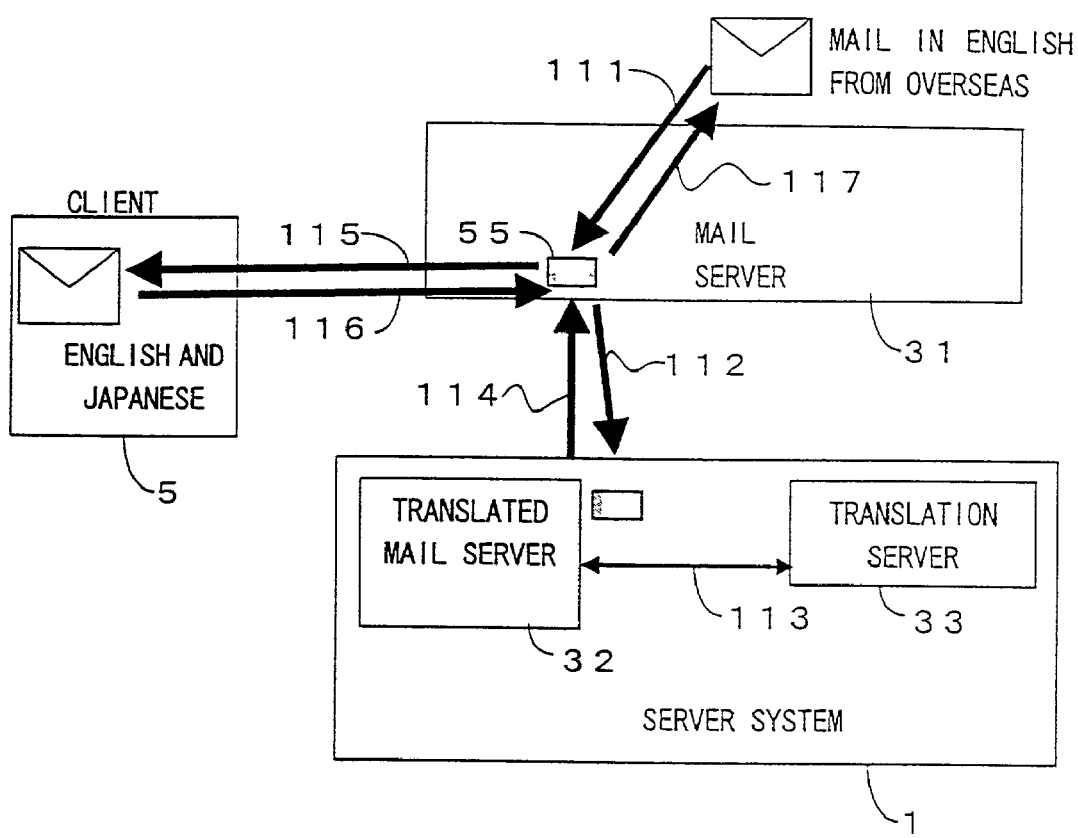
FIG. 9 is a diagram showing an architecture of a mail translation system in a second embodiment of the present invention.

A second embodiment of the present invention will be explained referring to FIGS. 9 through 13. FIG. 9 is a diagram showing an architecture of a mail translation system in the second embodiment. FIGS. 10 to 13 are flowcharts each showing processes of a control program executed by a CPU 51 of a translated mail server 32 shown in FIG. 9.

The homepage translation system has been described in the first embodiment. The second embodiment will exemplify the system for translating a mail instead of the homepage. The components and functions other than what is related to the mail are the same as those in the first embodiment. The same components are marked with the like numerals, of which the repetitive explanations are omitted. Further, as the necessity may arise, the drawings in FIGS. 1 through 8 are referred to.

<Architecture>

FIG. 9 is the diagram showing the architecture of the mail translation system. The mail translation system is constructed of a mail server 31 (corresponding to a server device) for managing a mailbox 55, a client device 5 (corresponding to a service receiving terminal) for receiving a mail service from the mail server 31, and a server system 1 for translating the mail in the mailbox 55. Further, the server system 1 comprises the translated mail server 32 and the translation server 33 that are connected on the network.

The mail server 31 receives a mail 111 from overseas, and drops the mail 111 into the mailbox 55. Further, the client device 5 accesses the mail server 31 and confirms whether a mail arrives. Then, the client device 5, if there is a mail that is not yet received, downloads it (115). Further, the mail server 31, in response to a request given from the client device 5, delivers a mail 116 created by the client device 5 to the external network (117).

The client device 5 provides a user interface. Namely, the client device 5 provides a tool for displaying the received mail on an unillustrated screen and editing a mail to be sent by the user.

A hardware architecture of the translated mail server 32 is the same as that of the translated text cache server 2 in the first embodiment (see FIG. 2). The translated mail server 32 monitors the mailbox 55. The translated mail server 32, when discovering a fresh mail in the mailbox 55, locks this mail in order to forbid accessing from other devices. Moreover, the translated mail server 32 reads that fresh mail and judges a mail description language. If the description language is English, the translated mail server 32 transfers the fresh mail to the translation server 33 and request the server 33 to translate it.

The translated mail server 32, upon receiving a translated result from the translation server 33, replaces a text of the fresh mail locked in the mailbox 55 with the translated result. Further, the translated mail server 32 unlocks the fresh mail, whereby the client device 5 can receive the mail after being translated.

<Function and Effect>

FIGS. 10 through 13 are the flowcharts showing the control program executed by the translated mail server 32.

The translated mail server 32 normally monitors the mailbox (S100). If no fresh mail exists (NO in the judgement in S100), the translated mail server 32 sets the control back to the monitoring of the fresh mail.

Whereas if the fresh mail exists (YES in S100), the translated mail server 32 locks this fresh mail (S01). This scheme is to prevent the client device 5 etc from reading the fresh mail before or midways of the translation.

Next, the translated mail server 32 executes a description language judging process of the mail text (S102). Note that the mail consists of a control element indicating a destination and a sender, a mail text defined as text information, and an appended document sent as an appendix to the mail text in the second embodiment.

If the mail text is English (YES in the judgement in S103), the translated mail server 32 requests the translation server 33 to translate the mail text (S104). When sending a result of the translation by the translation server 33 back to the translated mail server 32, the translated mail server 32 replaces the mail text locked within the mailbox with the translated result. Next, the translated mail server 32 proceeds the control to a judgement in S105.

If the mail text is Japanese (NO in the judgement in S103), the translated mail server 32 proceeds the control to the judgement in S105.

The translated mail server 32 judges in S105 whether or not the appended document exists (S105). If no appended document exists (NO in the judgement in S105), the translated mail server 32 advances the control to a process in S109. While on the other hand, if the appended document exists (YES in the judgement in S105), the translated mail server 32 executes a description language judging process of the appended document (S106) (the CPU 51 of the translated mail server 32, which executes the processes in S102 and S106, i.e., the description language judging process, corresponds to a description language judging unit).

The information on whether the appended document exists, a file name of the appended document and an appended document coding method carried out on the transmitting side, are described in the control element (header information) of the mail. Separate information for indicating a data part of the appended document is described in the mail text. Hence, the existence of the appended document can be judged from the control element (header information) of the mail. Accordingly, if the appended document exists, the appended document file can be restored from the coded data in the mail text, which are specified by the separate information, by a decoding process corresponding to the coding method on the transmitting side.

As a result of judging the description language, if the appended document is not English (it is Japanese), the translated mail server 32 proceeds the control to a process in S109.

Whereas if the appended document is English, the translated mail server 32 translates the appended document (S108). In this case, the translated mail server 32 reads the text information from the appended document. Note that the translated mail server 32 is capable of judging from an extension given to the file name of the appended document which application the document is used in, and makes an analysis corresponding to a document format thereof, thus reading the text information.

Next, the translated mail server 32 requests the translation server 33 to translate the read-out text information. When sending the a result of the translation by the translation server 33 back to the translated mail server 32, the translated mail server 32 replaces the text information of the appended document with the translated result. The translated appended document is thereby created. The translated mail server 32 further replaces the appended document in the mailbox with the translated appended document. Thereafter, the translated mail server 32 advances the control to the process in S109.

In the process in S109, the translated mail server 32 unlocks the fresh mail and returns to the monitoring of a fresh mail (S100).

Figure 10:
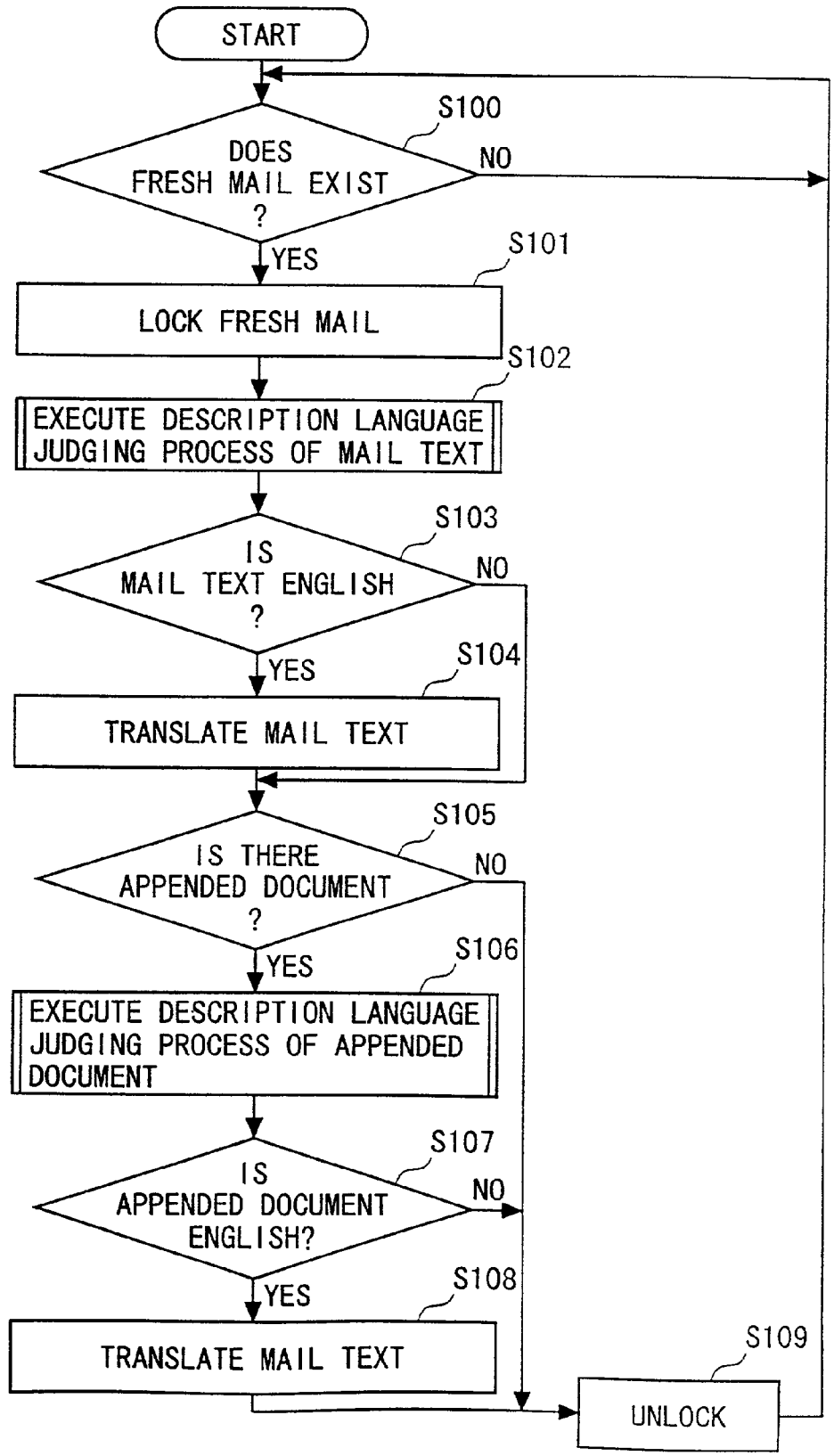
FIG. 10 is a flowchart showing processes of a translated mail server in the second embodiment of the present invention.

It may be taken for granted that the monitoring process of the fresh mail and the translating process in FIG. 10 are executed in parallel, and the processes for a plurality of fresh mails are executed in parallel.

Figure 11:
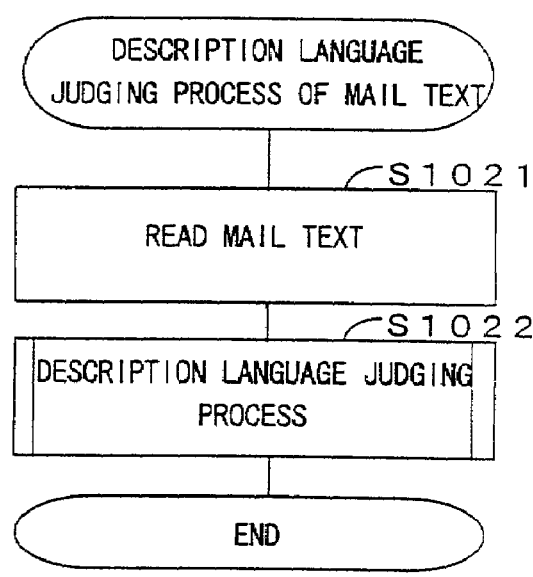
FIG. 11 is a flowchart showing a description language judging process of a mail text.

FIG. 11 is a flowchart showing the description language judging process of the mail text. In this process, the translated mail server 32, to start with, reads the mail text (S1021). Next, the translated mail server 32 executes the description language judging process (S1022). Thereafter, the translated mail server 32 finishes the description language judging process of the mail text.

Figure 12:
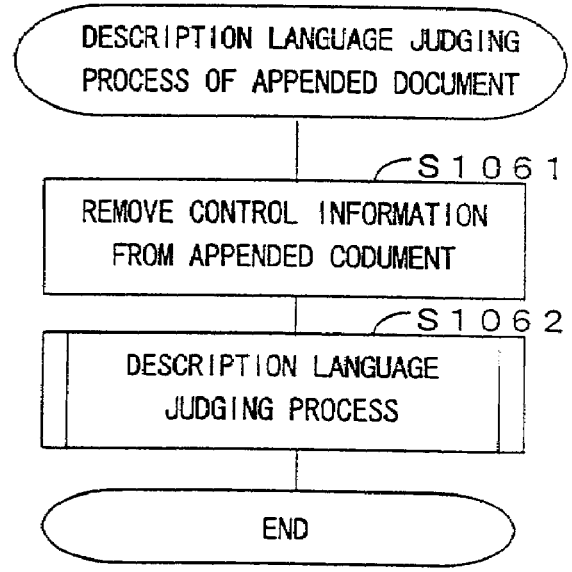
FIG. 12 is a flowchart showing a description language judging process of an appended document.

FIG. 12 is a flowchart showing the description language judging process of the appended document. In this process, the translated mail server 32 at first removes the control information out of the appended document (S1061). There are a case where the appended document is pure text information and a case where the appended document is binary information created by a word process, a spreadsheet program and a presentation document creation tool. Herein, the text information is extracted out of the appended document.

Next, the translated mail server 32 executes the description language judging process with respect to the extracted text information (S1062). Thereafter, the translated mail server 32 finishes the description language judging process of the appended document.

Figure 13:
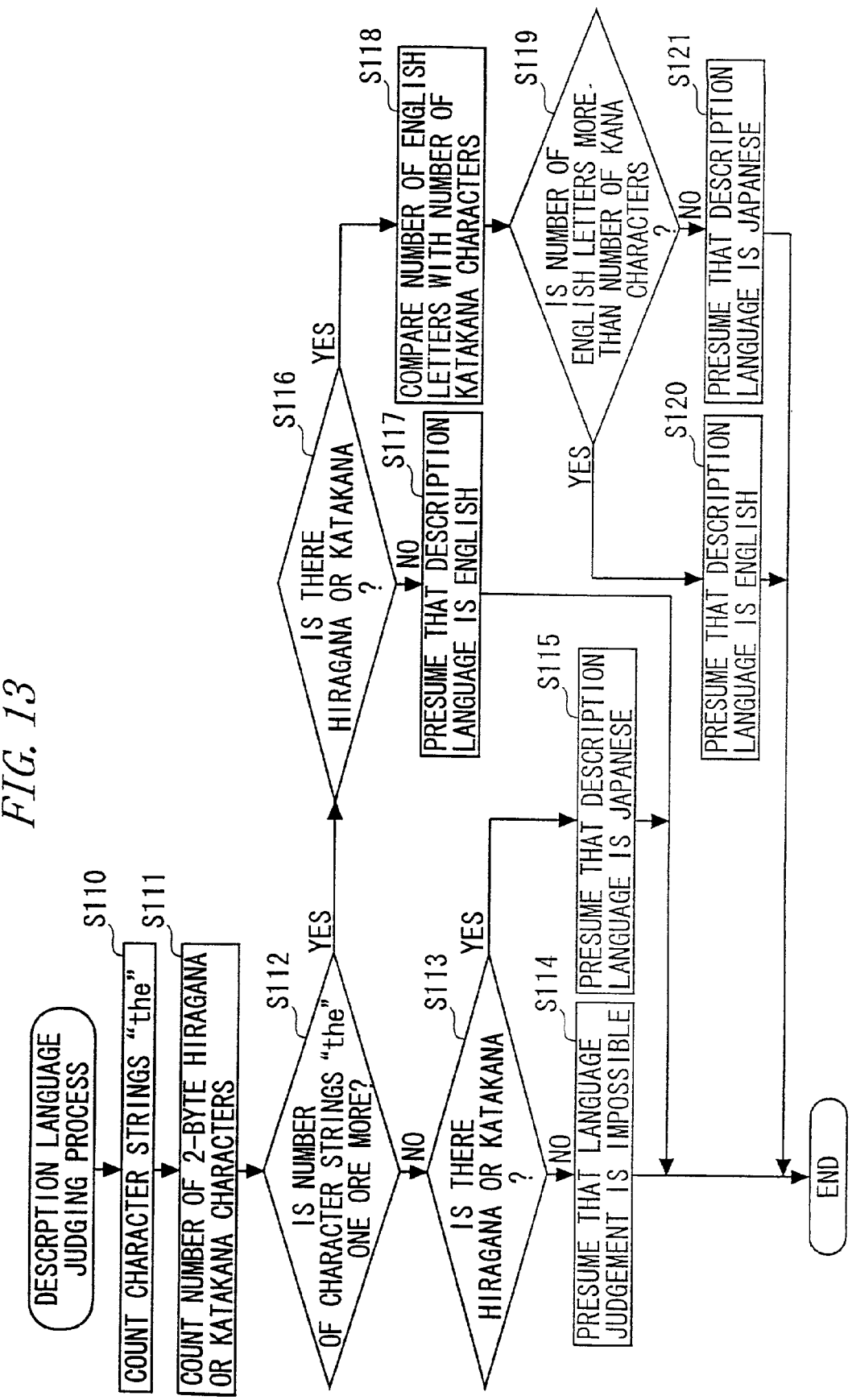
FIG. 13 is a flowchart showing the description language judging process.

FIG. 13 is a flowchart showing the description language judging process. In this process, the description language of the text information is judged.

To begin with, the translated mail server 32 counts the number of character strings "the" contained in the text information (S110). In this process, the translated mail server 32 deems the text information as 1-byte ASCII character strings, and counts the number of 3-byte strings corresponding to "the" therein. The reason why the existence of the character string "the" is checked as a judgement criterion for the description language, is that a using frequency of "the" is high in the English sentences, and "the" does not exist in other languages such as French, German and so on.

Next, the translated mail server 32 counts the number of characters of 2-byte hiragana or katakana contained in the text information (S111). In this process, the translated mail server 32 conceives the text information as combinations of 1-byte characters and 2-byte characters, and counts the number of byte strings corresponding to hiragana or katakana therein.

Next, the translated mail server 32 judges whether or not one or more character strings "the" exist in the text information (S112).

If one or more character strings "the" do not exist in the text information, the translated mail server 32 judges whether or not hiragana or katakana exists in the text information (S113).

When judging in S113 that neither hiragana nor katakana does exists in the text information, the translated mail server 32 presumes that the language judgement is impossible (S114), and finishes the description language judging process.

When judging in S113 that either hiragana or katakana exists in the text information, the translated mail server 32 presumes that the description language is Japanese (S115), and finishes the description language judging process.

While on the other hand, when judging in S112 that one or more character strings "the" exist therein, the translated mail server 32 further judges whether or not hiragana or katakana exists in the text information (S116). This process takes account of an English-Japanese mixture.

When judging in S116 that neither hiragana nor katakana does exists, the translated mail server 32 presumes that the description language is English (S117), and finishes the description language judging process.

When further judging in S116 that hiragana or katakana exists, the translated mail server 32 compares the number of English letters with the number of kana characters (S118). If the number of English letters is greater than the number of kana characters (YES in the judgement in S119), the translated mail server 32 assumes that the description language is English (S120) and finishes the description language judging process.

If the number of kana characters is larger than the number of English letters (No in the judgement in S119), the translated mail server 32 assumes that the description language is Japanese (S121), and finishes the description language judging process.

As discussed above, the mail translation system in the second embodiment automatically judges the description language of the fresh mail text or laid appended document. Then, if the description language is English (different from Japanese), this mail translation system automatically translates it. Accordingly, the user who receives the mail has no necessity of manually requesting to the translation system. Therefore, the present mail auto translation system is effective especially in an environment where a numerous number of mails are received from overseas.

Moreover, the translated mail server 32 reads the fresh mail arriving at the mailbox and executes the translation of the mail. Hence, the translation can be implemented irrespective of how much the client device 5 has resources (such as the capacity of the memory 62 and the performance of the CPU 61).

Moreover, the translated mail server 32 in the second embodiment distinguishes between English and Japanese on the basis of the number of character strings "the", i.e., the number of 2-byte hiragana or katakana characters in the text information. Such a simple character string is used for the judgement, and hence the translated mail server 32 does not need to retain a special dictionary. Consequently, the storage capacity (capacities of the memory 62 and of the hard disk 64) of the translated mail server 32 can be reduced.

<Modified Example>

The mail translation system in the second embodiment translates the mail in English that arrives from overseas into Japanese. The embodiment of the present invention is not, however, limited to this translation mode. For example, in a Japanese company's oversee branch office in a area where English is official language or in a U.S.A- or U.K-based Japanese company where English is the official language in the office, a Japanese-written mail arrived there may also be translated into English. The translated mail server 32 may store on the memory 52 or the hard disk 54 the description language (the principal language) of the document used in the service receiving terminal such as the client device 5 etc. Then, the translated mail server 32 may indicate the translation server 33 to translate it into the description language. Further, the translation server 33 may also retain the principal language.

In the second embodiment discussed above, the mail is automatically translated by judging whether the mail description language is English or Japanese. The embodiment of the present invention is not, however, confined to the mails in English and Japanese. For instance, the number of the definite articles "la" or "le" in French is counted in place of "the", thereby judging whether the description language is French or not. A fresh mail in French may also be thus automatically translated. Furthermore, the number of umlaut letters peculiar to German or the number of the definite articles "die" are counted, thereby judging whether the description language is German or not. A fresh mail in German may also be thus automatically translated.

In this case, the judgement might encounter different languages even in the same code system (1-byte notation/2-byte notation). For example, English and French may be exemplified as a 1-byte system, and Japanese and the Hunkul alphabet may be exemplified as a 2-byte system. Such being the case, if whether or not there are a word and a character code used in only the principal language is set as a judgment condition, it is feasible to enhance accuracy of the judgment.

Further, instead of counting the number of hiragana or katakana characters, the number of Hunkul alphabets is counted, thereby judging whether the description language is Hunkul or not. A fresh mail in Hunkul may also be thus automatically translated. As described above, the embodiment of the present invention is not limited to the mail description language.

The mail description language is judged from the counted result of the whole text information contained in the mail. Instead, the description language may also be judged based on a counted result of a specified part, e.g., a head 20-byte mail text of the text information of the mail.

Moreover, there is no necessity of newly providing the translation server 33, and the existing translation service can be utilized. This existing translation service is that when the original text is transmitted by way of E-mail to a predetermined address, the translation server executes the translating process and transmits its translated text back to the sender. For example, the translated mail server 32 extracts the text information of the E-mail and again transmits the text information of the E-mail to an address specified in the translation service, and the translated text to be sent back may be received and utilized for the processing according to the present invention.

Third Embodiment

Figure 14:
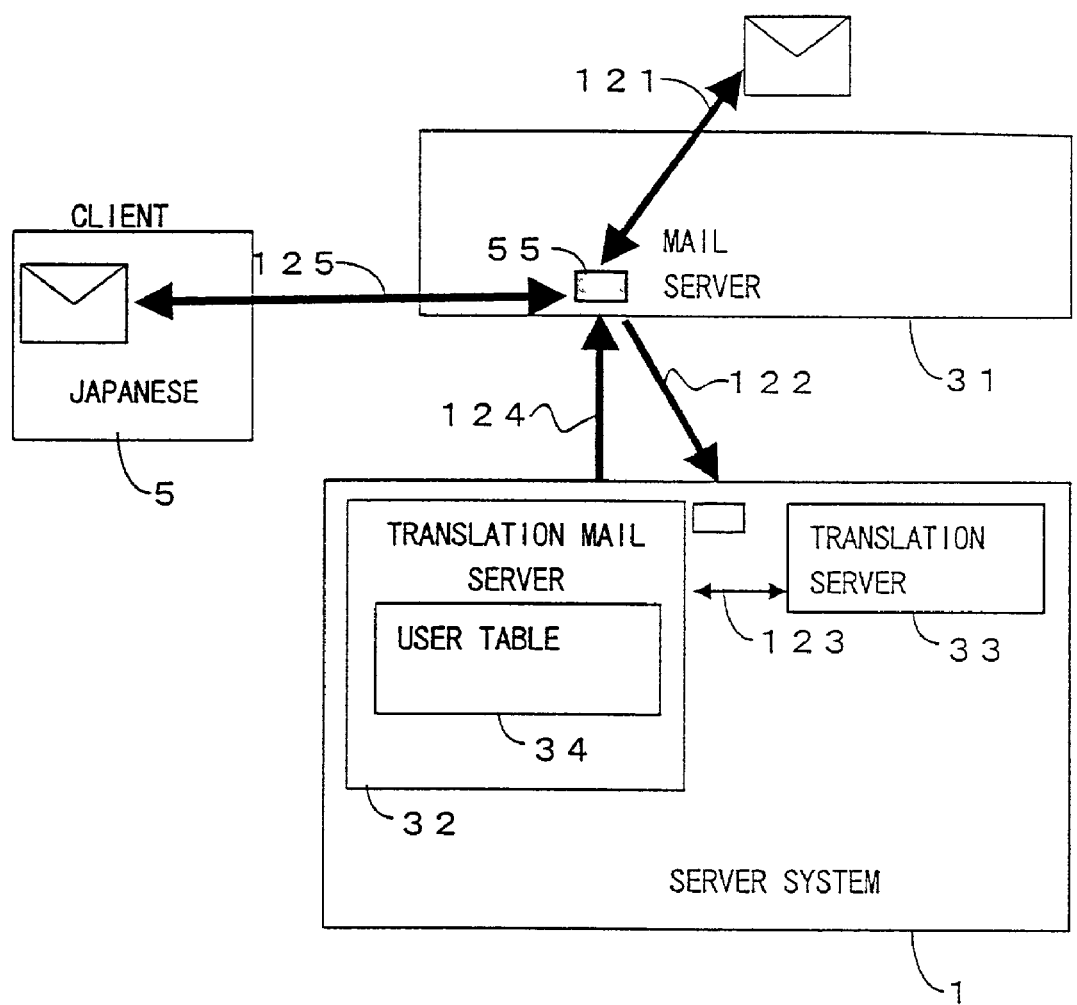
FIG. 14 is a diagram showing an architecture of the mail translation system in a third embodiment of the present invention.
Figure 16:
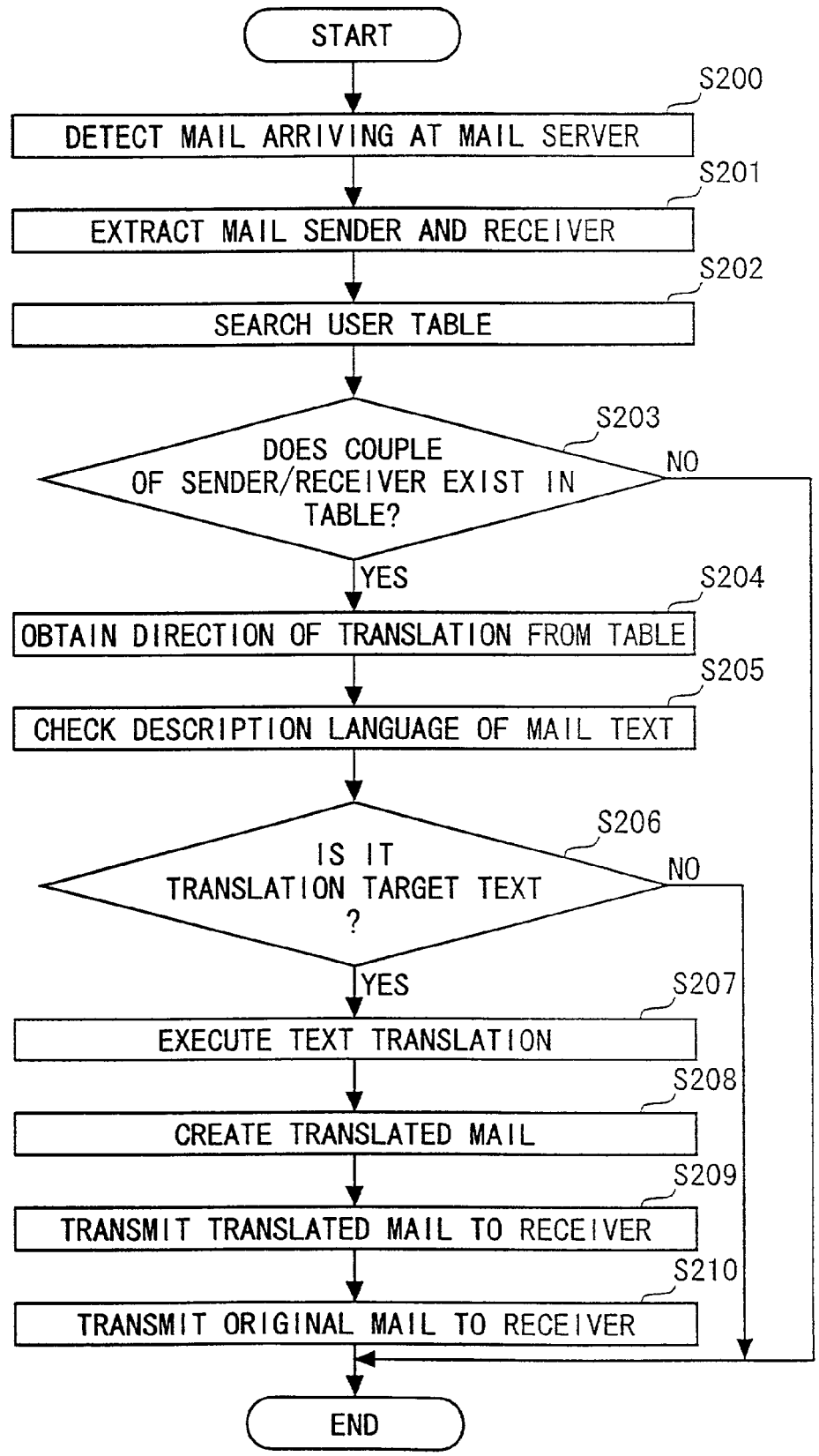
FIG. 16 is a flowchart showing a translating process in the third embodiment of the present invention.

A mail translation system in a third embodiment of the present invention will be explained referring to FIGS. 14 to 16. FIG. 14 is a diagram showing an architecture of this mail translation system. FIG. 15 is a diagram showing a data structure in a user table 34 to which the translated mail server 32 shown in FIG. 14 refers. FIG. 16 is a flowchart showing processes of a control program executed by the translated mail server 32.

The mail translation system demonstrated in the second embodiment monitors the fresh mail in the mailbox, and, if the description language thereof is English, automatically translates the mail into Japanese.

In accordance with the third embodiment, there will be explained the mail translation system for translating the mail in accordance with the user table 34 (corresponding to a user information storage module) registered with couples of mail senders and receivers instead of judging the description language. Other components and functions are the same as those in the second embodiment. The same components are marked with the like numerals, of which the repetitive explanations are omitted. Further, as the necessity may arise, the drawings in FIGS. 1 through 13 are referred to.

<Architecture>

FIG. 14 is the diagram showing the architecture of this mail translation system. This mail translation system is substantially the same as the system in the second embodiment, except that the translated mail server 32 is provided with the user table 34. Note that a functional difference from the second embodiment is that this mail translation system automatically translates both of the mail arrived and the mail delivered.

FIG. 15 is the diagram showing the data structure in the user table 34. In the user table 34, a direction of the translation is defined for the couple of mail sender and receiver.

As shown in FIG. 15, this table consists of records each composed of fields such as Registration No., Sender, Receiver and Direction of Translation.

Registration No. is a serial number of the record registered.

An address of the mail sender is specified in the field "Sender". On the other hand, an address of the mail receiver is described in the field "Receiver".

The field "Direction of Translation" specifies which direction, Japanese-English or English-Japanese, the translation is executed in. For instance, the direction of Japanese-English specifies that Japanese is translated into English.

The user table is registered with a multiplicity of records described above, thereby specifying necessities and directions of the translations of the mails (delivered and received) that exist in the mailbox.

For example, in a record with Registration No. 1 in FIG. 15, English-Japanese is specified as the direction of translation with respect to a couple of Sender ALL and Receiver skasai@aaa.co.jp. In this case, all the mails addressed to Receiver skasai@aaa.co.jp are translated from English into Japanese.

Further, in a record with Registration No. 2, Japanese-English is specified with respect to a couple of Sender skasai@aaa.co.jp and Receiver jack@bbb.com.

Thus, the mail translation system in the third embodiment automatically executes the translation in accordance with the user table 34 regardless of whether it is the delivered mail or the received mail.

<Function and Effect>

FIG. 16 is a flowchart showing the translating process in the third embodiment. The mail server 33, the translated mail server 32 and the translation server 33 shown in FIG. 14 execute the respective control programs, thereby attaining the processes in FIG. 16.

To begin with, in the mail translation system, the translated mail server 32 monitors inside the mailbox, and detects that a mail arrives at the mail server 31 (S200).

Next, the translated mail server 32 extracts a sender and receiver of this mail out of the control information (S201).

Subsequently, the translated mail server 32 searches the user table 34 (S202) and judges whether or not a couple of the sender and receiver extracted above exists in the user table 34 (S203).

If this couple of the sender and receiver does not exist in the user table 34, the translated mail server 32 executes nothing, and makes the mail server execute a process in S210.

Whereas if this couple of the sender and receiver exists in the user table 34, the translated mail server 32 obtains a direction of the translation from the user table 34 (S204).

Next, the translated mail server 32 checks a description language of the mail text (S205). This process is the same as what is shown in FIGS. 11 and 13, and hence its explanation is omitted.

Subsequently, the translated mail server 32 judges based on the description language of the mail text and the direction of the translation in the user table 34 whether that mail is a target for translation or not (S206). For instance, when the description language of the mail text is English, and when the direction of the translation is English-Japanese, this mail is judged to be the translation target. If not the translation target (NO in the judgement in S206), the translated mail server 32 executes nothing, and makes the mail server execute a process in S210.

While on the other hand, when judging that the mail concerned is the translation target (YES in the judgement in S206), the translated mail server 32 requests the translation server 33 to translate the mail text (S207).

Next, the translated mail server 32, based on the translated result, creates a translated mail by replacing the mail text with the translated result. Then, the translated mail server 32 registers the translated mail in the mailbox (S208). Thereafter, the translated mail server 32 finishes the processing of this mail.

After the processing by the translated mail server 32, the mail server 31 transmits the translated mail to the mail receiver (S209).

Next, the mail server 31 transmits the mail as the original to the receiver (S210). With the processing thus done, the mail auto translation and the sending process are carried out.

As described above, the mail translation system judges based on the definitions in the user table 34 and the description language whether the mail concerned is the translation target or not, and determines the direction of the translation. Therefore, the mail translation system flexible enough not to cause any error in terms of the direction of the translation, can be configured.

<Modified Example>

The embodiment discussed above has exemplified the mail translation system for executing the Japanese-English or English-Japanese translation. The embodiment of the present invention is not, however, confined to the direction of the translation, i.e., the description language of the mail. For example, Japanese-Hunkul, Hunkul-Japanese, Japanese-German, German-Japanese, Japanese-French, French-Japanese etc may also be specified as directions of the translation. Accordingly, an arbitrary language supported by the translation server may be set as a translation target in the present mail translation system.

Further, there is no necessity of newly providing the translation server 33, and the existing translation service can be also utilized. This existing translation service is that when the original text is transmitted by way of E-mail to a predetermined address, the translation server executes the translating process and transmits its translated text back to the sender. For example, the translated mail server 32 extracts the text information of the E-mail and transmits the text information of the E-mail to an address specified in the translation service. The translated mail server 32 receives the translated text to be sent back and may utilize these sentences for the processing according to the present invention.

Fourth Embodiment

Figure 17:
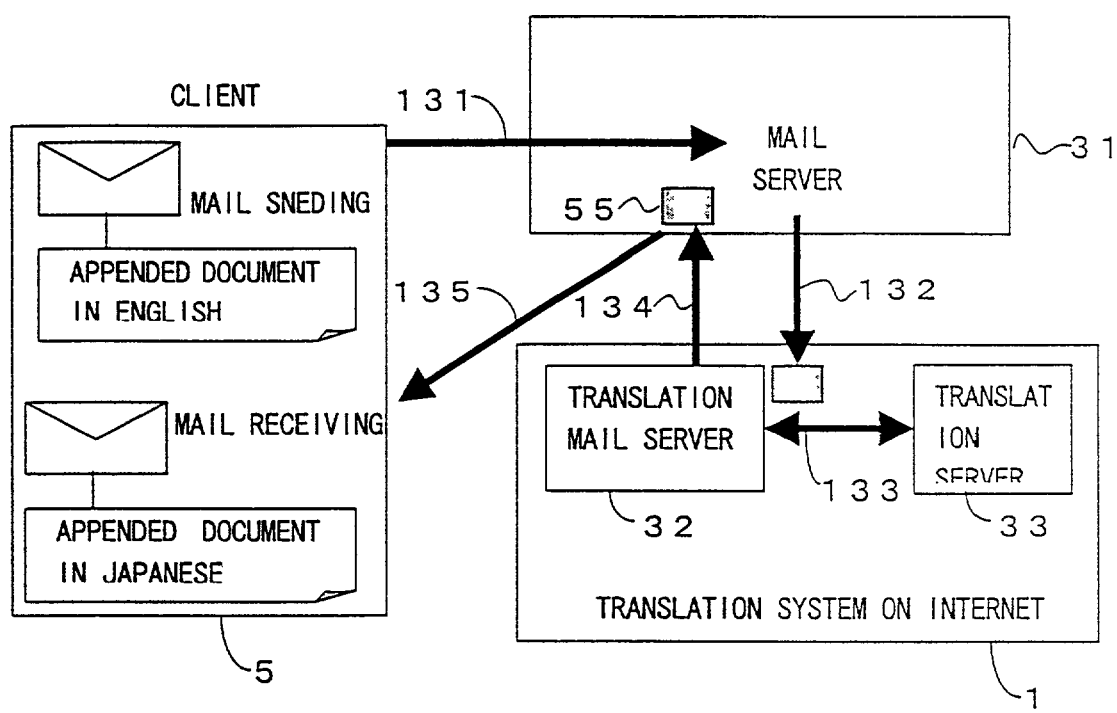
FIG. 17 is a diagram showing an architecture of a translation system in a fourth embodiment of the present invention.

A mail translation system in a fourth embodiment of the present invention will be described referring to FIG. 17. FIG. 17 is a diagram showing an architecture of this mail translation system.

The second and third embodiments discussed above have exemplified the mail translation system designed to monitor the fresh mail in the mailbox and to translate the description language thereof.

What will be explained in the fourth embodiment is the mail translation system designed to translate an appended document described in English and appended to a mail transmitted from the client device 5.

Other configurations and functions are the same as those in the second embodiment, and the same components are marked with the like numerals, of which the repetitive explanations are omitted. Further, as the necessity may arise, the drawings in FIGS. 1 through 16 are referred to.

<Architecture>

FIG. 17 is the diagram showing an architecture of this mail translation system. This mail translation system is, as in the second embodiment, constructed of the client device 5, the mail server 31, the translated mail server 32 and the translation server 33.

The client device 5 is used as a user interface for creating a document and making a request for translating the document. The user, when having a document to be translated into English in the process of creating the document by use of the client 5, appends this document to the mail and sends this mail to the translated mail server 32 given a predetermined address for Japanese-English translation.

The mail server 31 transmits this mail to the translated mail server 32.

The translated mail server 32 reads the appended document from the mail received with the Japanese-English translation oriented address. Further, the translated mail server 32 sends the text information to the translation server 33 and requests the server 33 to translate it. When a translated result is sent back, the translated mail server 32 rewrites the appended document with the translated result, thus creating the translated appended document.

Next, the translated mail server 32 transmits the mail appended with the translated appended document back to the mail server. The mail server stores this reply mail in the mailbox.

The client device 5 reads the reply mail in the mailbox, and displays the translated reply mail. The user is thereby able to translate the appended document.

Similarly, the user sends the appended document in English to a English-Japanese translation oriented address, whereby the appended document in English can be translated into Japanese.

<Modified Example>

According to the mail translation system in the fourth embodiment, the direction of the translation (Japanese-English, English-Japanese) is specified by the address received by the translated mail server 32. The embodiment of the present invention is not, however, limited to this mode. For instance, the user specifies the direction of the translation when sending the mail, and this specified direction may also be retained in the mailbox 55. The mail server 31 transfers the mail with its translation specified to the translated mail server 32. Then, after a translated result has been sent back, this mail may also be transmitted back to the sender.

Further, such a translation may be carried out together with the transmission of the mail from one user to another. Namely, the mail server 31 confirms whether or not a mail with its translation specified among the mails requested to be transmitted exists in the mailbox. The mail server 31 transmits the mail with its translation unspecified as it is. On the other hand, the mail server 31, before transmitting the mail with its translation specified to its original destination, transfers this mail to the translated mail server 32. Then, after the translated result has been sent back, the mail server 31 replaces this mail text with the translated result, and may transmit it to the original destination.

Fifth Embodiment

Figure 18:
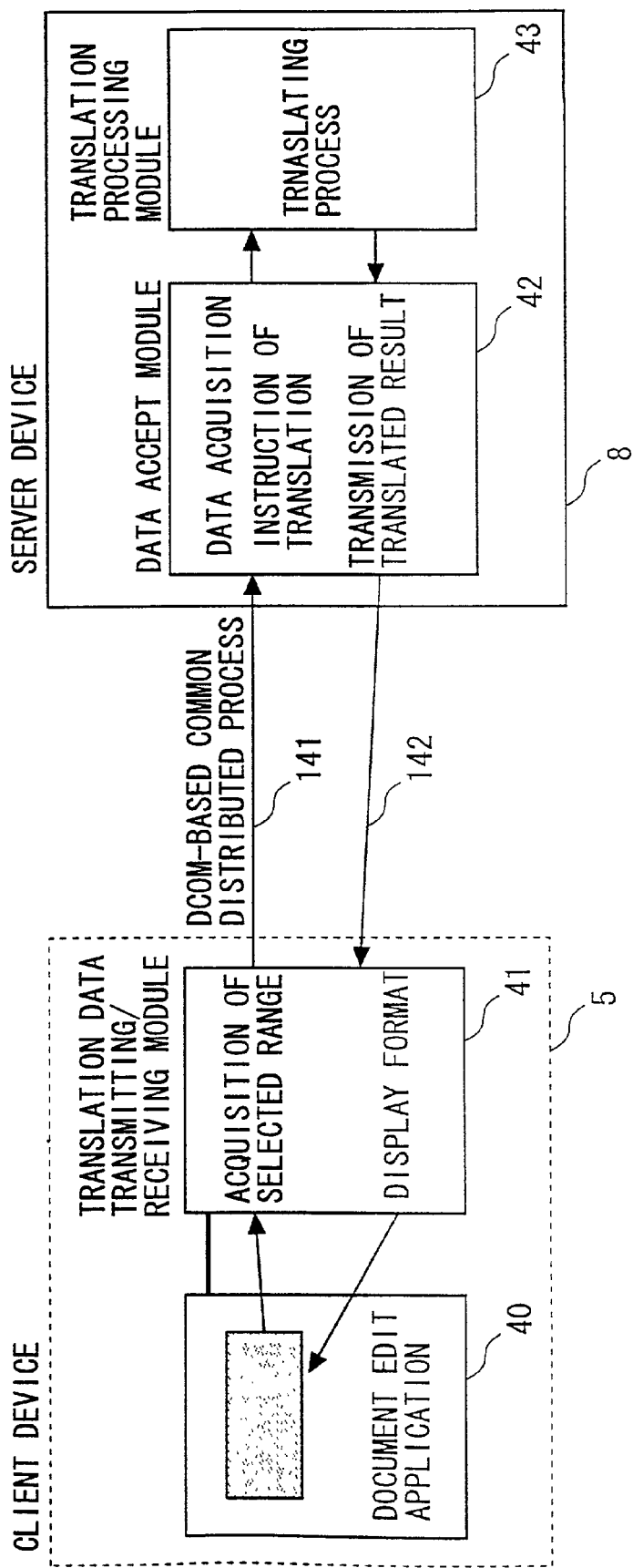
FIG. 18 is a diagram showing an architecture of the translation system in a fifth embodiment.
Figure 19:
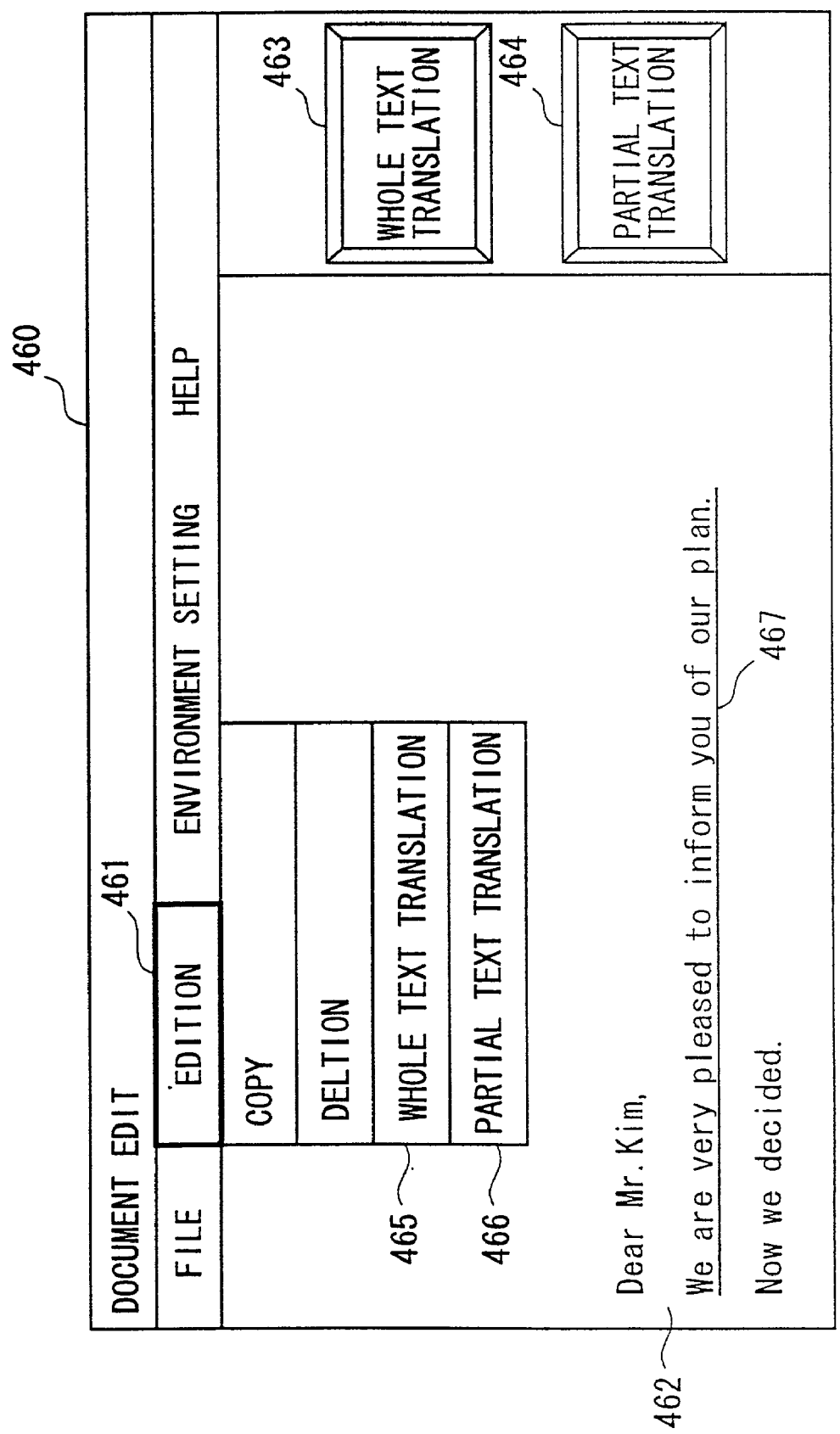
FIG. 19 is a view showing a display screen of a document edit application program.
Figure 20:
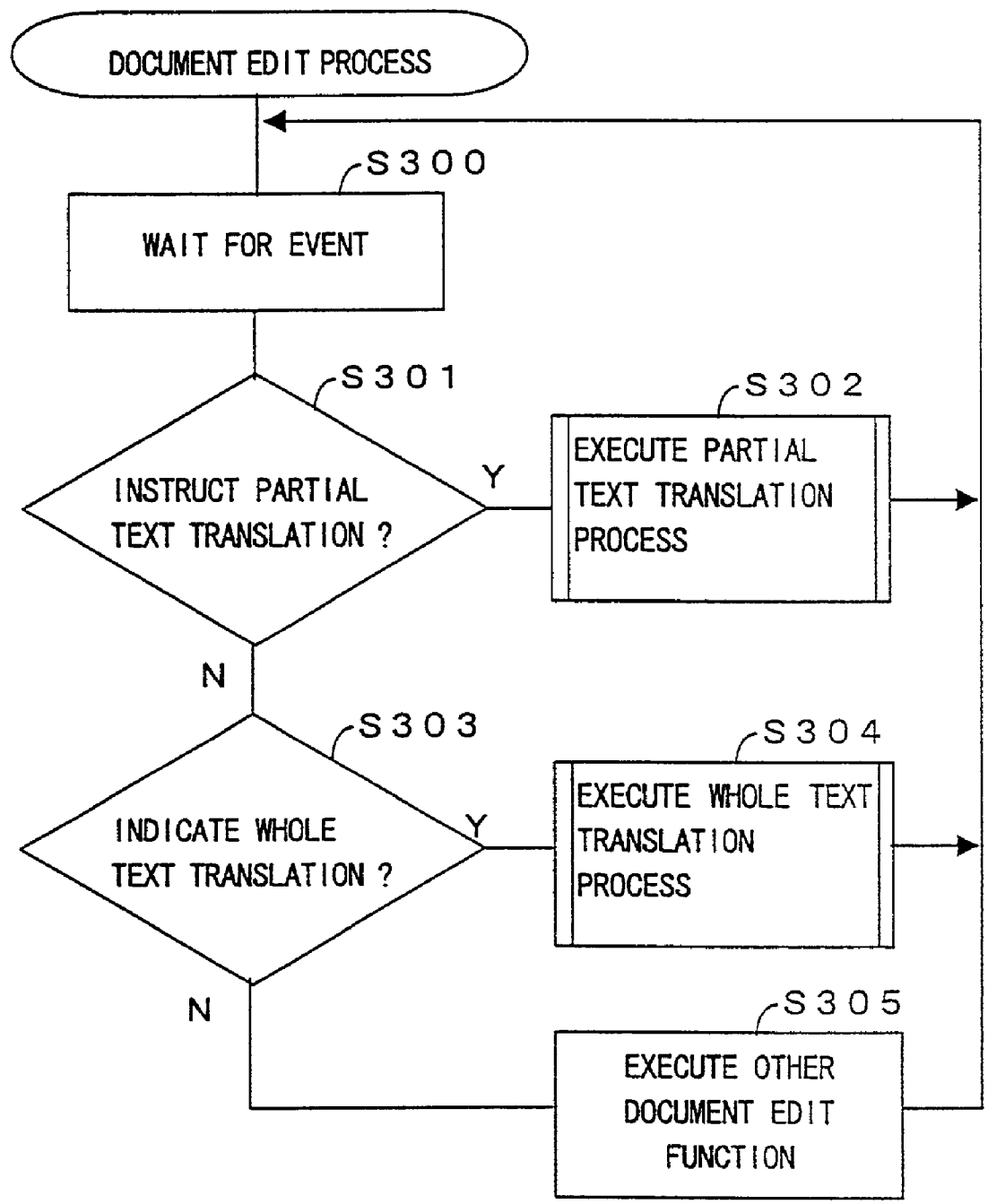
FIG. 20 is a flowchart showing a document edit process.
Figure 21:
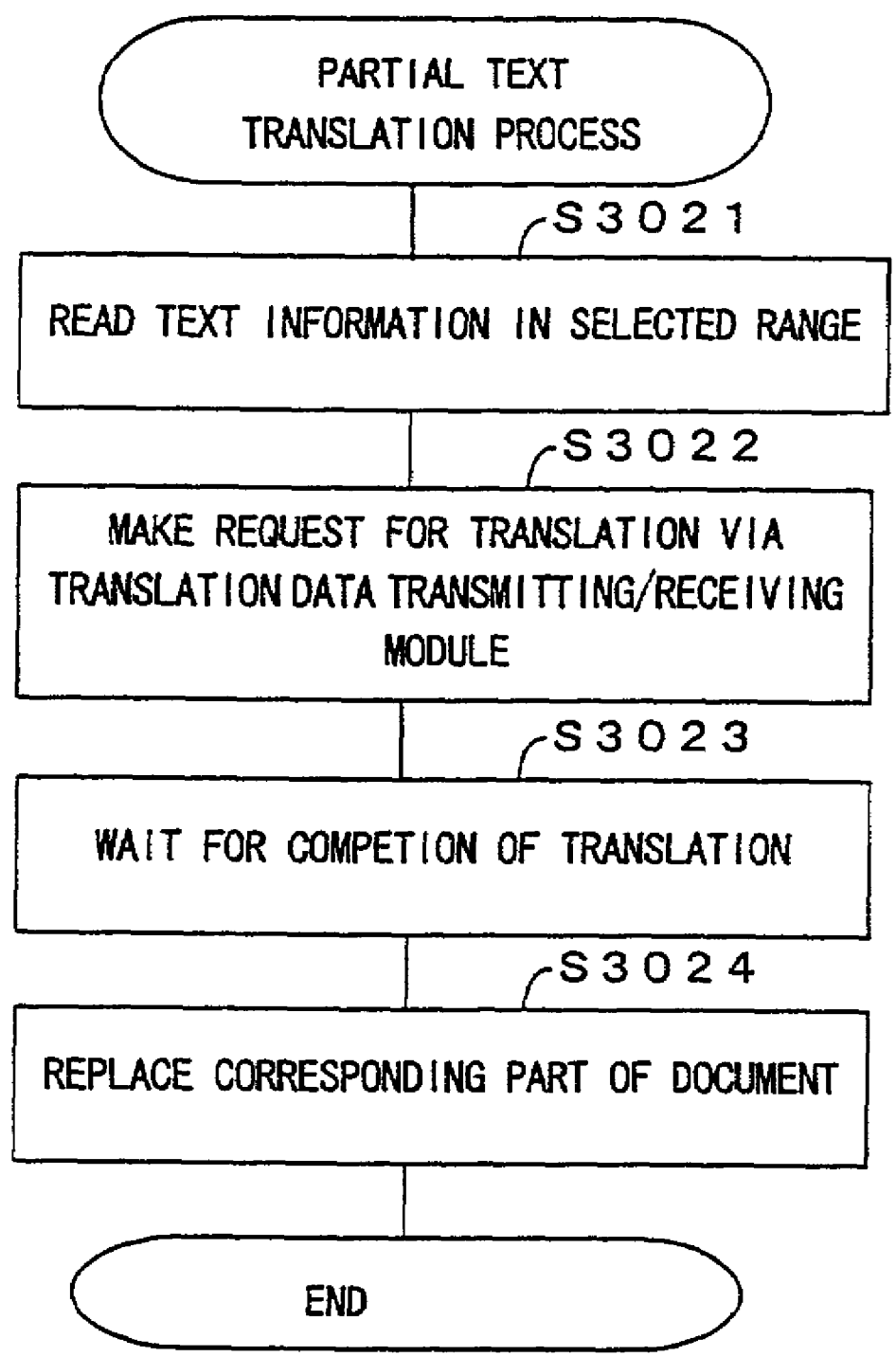
FIG. 21 is a flowchart showing a partial text translating process.

A fifth embodiment of the present invention will be discussed with reference to the drawings in FIGS. 18 through 22. FIG. 18 is a diagram showing an architecture of the translation system in the fifth embodiment. FIG. 19 shows a display screen of a document edit application program 40 executed by the client device 5. FIGS. 20 and 21 are flowcharts each showing processes of the document edit application program 40 executed by the CPU 61 (in FIG. 2) of the client device 5 shown in FIG. 18.

In the first through fourth embodiments, the homepage or mail translation system has been explained. The discussion in the fifth embodiment will be focused on the translation system in linkage with the document edit application program. This translation system comprises the client device 5 for executing the document edit application program, and a server device 8 for executing the translation. Other configurations and functions are the same as those in the first through fourth embodiments. The same components are marked with the like numerals, of which the repetitive explanations are omitted.

FIG. 18 is the diagram illustrating the architecture of this translation system. This translation system is constructed of the client device 5 (corresponding to a terminal device) for executing the document edit application program 40, and the server device 8 for receiving a translation request from the client device 5 and executing the translation.

The CPU 61 of the client device 5 executes the document edit application program 40, thereby providing a function as a document creating device (the CPU 61 of the client device 5, which executes the document edit application program 40, corresponds to a document editing unit). The document edited by the client device 5 with the aid of the document edit application program 40, contains display control information for displaying a size, position and shape of character and a ruled line etc in addition to the text information (corresponding to statement information).

Further, the client device 5 executes a control program containing a translation data transmitting/receiving module 41, and performs the communications with the server device 8 (the CPU 61 of the client device 5, which executes the translation data transmitting/receiving module 41, corresponds to a transmitting/receiving unit). The communications with this server device 8 are actualized based on DCOM (Distributed Component Object Model) provided as a function of Windows 98 etc from Microsoft Corp., U.S.A. Through the communications described above, the document edit application program 40 of the client device 5 makes the server device 8 function to translate the document in the process of being edited. This function enables the user to specify a part of the document in the process of being created and to translate this specified part of the document. Moreover, the whole of the created document can be also translated.

FIG. 19 illustrates a display screen 460 displayed on a CRT 65 (shown in FIG. 2) when the CPU 61 of the client device 5 executes the document edit application program 40. This display screen 460 includes a menu bar consisting of a file menu, an edit menu 461, an environment setting menu and a help menu, an edit area 462 for editing and displaying the text information, a whole text translation button 463 and a partial text translation button 464.

The edit menu 461 is provided with functional items such as copy, deletion, a whole text translation 465 and a partial text translation 466.

The whole text translation 465 of the edit menu 461 serves to specify the translation of the whole text information of the document in the process of being edited. The CPU 61 (shown in FIG. 2) of the client device 5, upon detecting that the whole text translation 465 is selected, transmits the whole text information in the process of being now edited to the server device 8, and makes the server device 8 translate it. The same function is implemented also by the whole text translation button 463.

The partial text translation 466 of the edit menu 461 serves to specify the translation of a partial text with its range dragged by a mouse 67 (corresponding to a selecting device). The drag is defined as an operation of depressing a desired position (selection start position) in the document displayed on the screen, then moving this point down to a desired end position, and thus specifying a desired range.

Referring to FIG. 19, an underline 467 indicates the text selected. In this state, when the partial text translation 466 is selected, the CPU 61 of the client device 5 transmits the partial text information underlined 467 to the server device 8 and makes the server device 8 translate it. Note that the same function is executed also by the partial text translation button 464. The whole text translation 465, the partial text translation 466 of the edit menu 461, or the whole text translation button 463 and the partial text translation button 464, correspond to instruction unit.

The server device 8 is connected via the network to the client device 5. The server device 8 executes a control program consisting of a data accept module 42 (the CPU 51 of the server device 8, which executes the data accept module 42, corresponds to a transmitting/receiving unit) and a translation processing module 43 (the CPU 51 executing the translation processing module 43 corresponds to a translation unit), thereby providing a translating function. A hardware architecture of the server device 8 is the same as that of the translated text cache server 2 shown in FIG. 2.

The data accept module 42 performs the DCOM-based communications with a translation data transmitting/receiving module 41 of the control program executed by the client device 5, and receives the translation data and a translation instruction. Then, the data accepting module 42 transfers this item of translation data to the translation processing module 43, and requests the module 43 to translate it. Further, the data accepting module 42 sends a translated result to the translation data transmitting module 41 of the client device 5 through the DCOM-based communications.

The translation processing module 43 executes the data translation requested by the data accepting module 42.

<Function and Effect>

Figure 22:
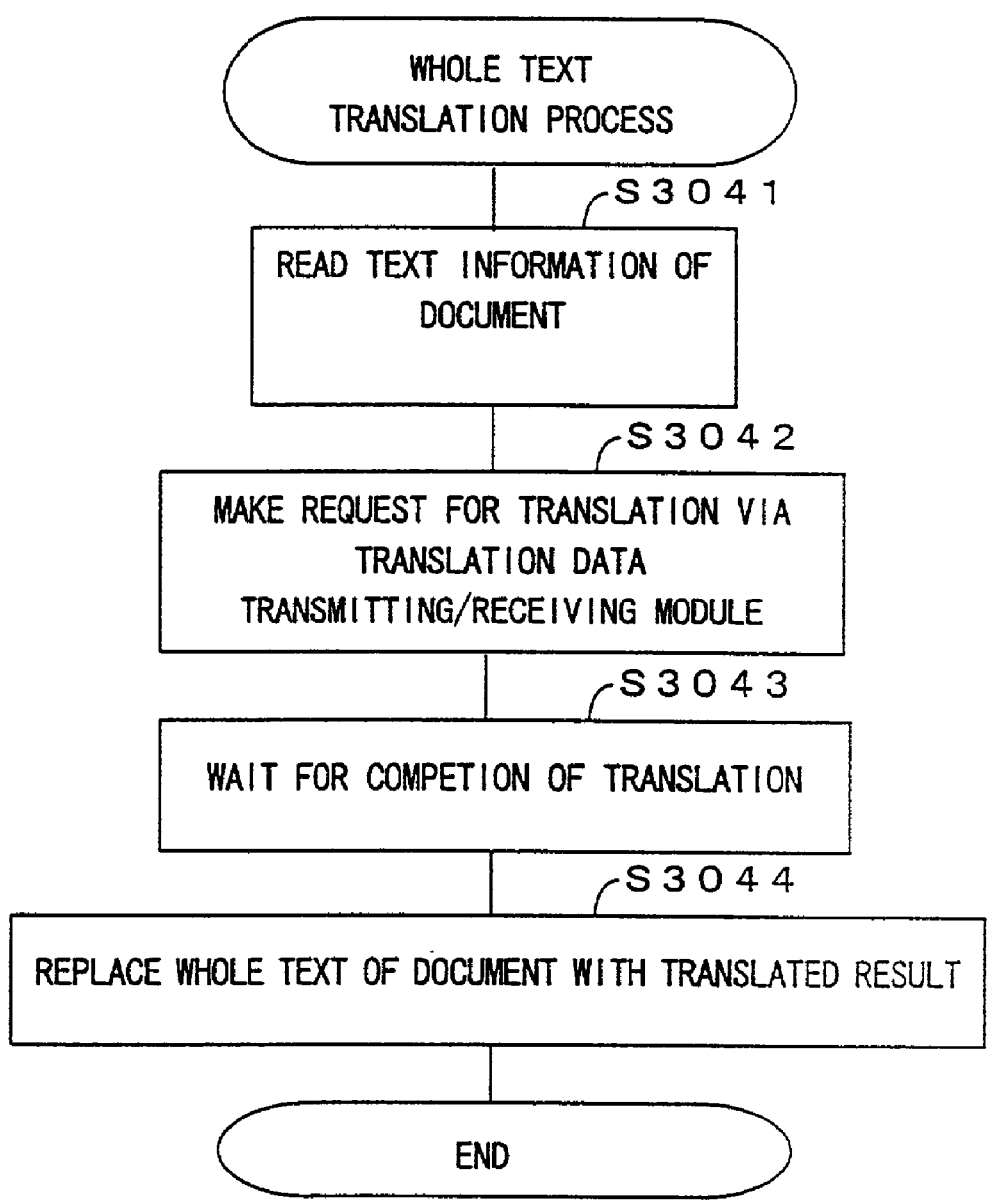
FIG. 22 is a flowchart showing a whole text translating process.

FIGS. 20 through 22 show processes of the document edit application program 40 executed by the client device 5. The client device 5 executes this application program 40, thereby providing a document edit function.

As shown in FIG. 20, the client device 5 is normally in await-for-event state (S300). The event is defined as an outside factor for changing a state of the client device 5. When the event occurs, the client device 5 judges a category of this event.

To start with, the client device 5 judges whether or not the event is an instruction of the partial text translation (S301). If the event is the instruction of the partial text translation, the client device 5 executes a partial translating process (S302). Thereafter, the client device 5 reverts to the wait-for-event state (S300).

Whereas if not the indication of the partial text translation, the client device 5 judges whether or not the event is an instruction of the whole text translation (S303). If the event is the instruction of the whole text translation, the client device 5 executes a whole translating process (S304). Thereafter, the client device 5 reverts to the wait-for-event state (S300).

If the event is nether the indication of the partial text translation nor the indication of the whole text translation, the client device 5 executes other document edit function (S305). Thereafter, the client device 5 returns to the wait-for-event state (S300).

FIG. 21 shows the partial translation process. The partial translation process is a process of translating a part of the document in the process of being edited. In this process, the user selects a part of the on-edit document by dragging. The user executes the partial text translation in this state. The partial text translation is carried out by selecting the partial text translation 466 of the edit menu 461 or depressing the partial text translation button 464. With these operations, the partial translation instructing event occurs.

When the partial translation instructing event occurs, the client device 5, to begin with, reads the text information in the selected range (S3021). Next, the read-out text information is stored in an unillustrated shared memory of the client device 5.

Subsequently, the client device 5 requests the translation server for the translation via the translation data transmitting/receiving module 41 (S3022). The translation data transmitting/receiving module 41 sends a statement and a translation command put on the unillustrated shared memory to the data accepting module 42 of the server device 8 through the DCOM-based communications.

Thereafter, the client device 5 comes to a state of waiting for a completion of the translation (S3023). At this time, the text is handed over to the translation processing module 43 from the data accepting module 42, and the translation is carried out by the server device 8. A translated result is sent back to the client device 5 from the data accepting module 42 in accordance with DCOM.

When the translated result is sent back, the client device 5 replaces the corresponding part of the document with the translated result (S3024).

FIG. 22 shows the whole text translation process. The whole text translation process is a process of translating the whole of the on-edit document. The whole text translation is executed by selecting the whole text translation 465 of the edit menu 461 or depressing the whole text translation button 463. With these operations, a whole translation instructing event occurs.

When the whole translation instructing event occurs, the client device 5, to start with, reads the text information from the on-edit document (S3041). Next, the read-out text information is stored in an unillustrated shared memory of the client device 5.

Subsequently, the client device 5 requests the translation server for the translation via the translation data transmitting/receiving module 41 (S3042). The translation data transmitting/receiving module 41 sends a statement and a translation command put on the unillustrated shared memory to the data accepting module 42 of the server device 8 through the DCOM-based communications.

Thereafter, the client device 5 comes to a state of waiting for a completion of the translation (S3043). At this time, the text is handed over to the translation processing module 43 from the data accepting module 42, and the translation is carried out by the server device 8. A translated result is sent back to the client device 5 from the data accepting module 42 in accordance with DCOM.

When the translated result is sent back, the client device 5 replaces the whole text of the document with the translated result (S3044).

As discussed above, according to the translation system in the fifth embodiment, the translation is executed by the server device 8, and hence the client device 5 does not need the resources (the performance of the CPU 61 and the capacity of the memory 62) for the translation process. Accordingly, even the client device 5 having a small quantity of resources such as the handheld terminal etc is capable of executing the translation with a less load.

<Modified Example>

In the embodiment discussed above, the DCOM-based communications are implemented between the client device 5 and the server 8. The embodiment of the present invention is not, however, limited to this communication method. For instance, RPC (Remote Procedure Call) provided in UNIX operating system may also be applied to the communications between the client device 5 and the server 8.

What has been dealt with in the embodiment discussed above is the translating function in the document edit application program 40. The embodiment of the present invention is not, however, confined to the category of this document edit application program 40. Namely, the category of the document edit application program 40 may be diversified such as a word processor, a spreadsheet program, a presentation material creating program, a text editor and so forth.

In the fifth embodiment discussed above, the client device 5 includes the mouse 67, and the user specifies the text information to be partially translated by the dragging of the mouse 67. The embodiment of the present invention is not, however, restricted to this device. For example, a touch panel (4) may be used as a substitute for the mouse 67. Further, a pointing device for a flat space etc may also be used. Moreover, for example, a substitute for dragging may also be such an operation that two positions are consecutively depressed, and the text information may be selected from a rectangular region in which a straight line connecting these two points is set as a diagonal line of the rectangle. Alternatively, a character string interposed between those two points may also be set as a translation target.

Further, there is no necessity of newly providing the translation server 3, and the existing translation service can be utilized. The existing translation service is that when the original text is transmitted by way of E-mail to a predetermined address, the translation server executes the translating process and transmits its translated text back to the sender. For example, the server device 8 extracts the text information of the HTML data and transmits the text information by way of E-mail to an address specified in the translation service. Then, the server device 8 receives the translated text to be sent back and may utilize for the processing according to the present invention.

What is claimed is:

1. A terminal device connected to a network via a first relay device relaying relay data to be translated with translating the same data and a second relay device relaying the relay data without translating the same data, said terminal device comprising:

an information acquisition module acquiring information from the network;

a translation specification recognizing unit recognizing whether the translation of the information is specified or not; and a routing unit switching over said relay devices when accessing the network, wherein when recognizing that the translation is specified, said routing unit accesses the network to obtain the information translated by said first relay device, and when recognizing no specification of the translation, said routing unit accesses the network to obtain the information that is not translated from said second relay device; and a display unit displaying the information, wherein the information before being translated and the translated information are displayed in a side-by-side translation format in which these pieces of information are arranged with respect to every predetermined part.

2. A terminal device according to claim 1, further comprising:

an individual translation indicator indicating a translation of information acquired by said information acquisition module from the network for every information; and an auto translation indicator uniformly indicating the translation of the information acquired by said information acquisition module from the network.

3. A terminal device according to claim 1, wherein the display unit comprises a plurality of screen areas displaying the information, wherein the information before being translated and the translated information are displayed respectively in the screen areas different from each other.

* * * * *